(12) United States Patent
Takeda et al.

(10) Patent No.: US 11,522,657 B2
(45) Date of Patent: Dec. 6, 2022

(54) MULTICAST FEEDBACK BASED ON REFERENCE SIGNAL TRANSMISSIONS

(71) Applicant: QUALCOMM Incorporated, San Diego, CA (US)

(72) Inventors: Kazuki Takeda, Tokyo (JP); Alberto Rico Alvarino, San Diego, CA (US); Ayan Sengupta, San Diego, CA (US); Jing Sun, San Diego, CA (US); Le Liu, Fremont, CA (US); Miguel Griot, La Jolla, CA (US); Mostafa Khoshnevisan, San Diego, CA (US); Peter Gaal, San Diego, CA (US); Prasad Reddy Kadiri, San Diego, CA (US); Xiaoxia Zhang, San Diego, CA (US); Tao Luo, San Diego, CA (US); Umesh Phuyal, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 55 days.

(21) Appl. No.: 17/097,877

(22) Filed: Nov. 13, 2020

(65) Prior Publication Data

US 2021/0152307 A1 May 20, 2021

Related U.S. Application Data

(60) Provisional application No. 62/935,945, filed on Nov. 15, 2019.

(51) Int. Cl.
*H04L 5/00* (2006.01)
*H04W 4/06* (2009.01)
(Continued)

(52) U.S. Cl.
CPC ............ *H04L 5/0048* (2013.01); *H04W 4/06* (2013.01); *H04W 24/08* (2013.01); *H04L 12/189* (2013.01)

(58) Field of Classification Search
CPC ..... H04B 7/063; H04B 7/0639; H04L 5/0048; H04L 5/0094; H04L 12/1868;
(Continued)

(56) References Cited

U.S. PATENT DOCUMENTS

2018/0248736 A1* 8/2018 Davydov .............. H04W 76/27
2019/0058561 A1 2/2019 Ho et al.
(Continued)

OTHER PUBLICATIONS

Interdigital Inc: "Discussion on Physical Layer Procedures for NR V2X Sidelink", 3GPP Draft, R1-1902596, Discussion on Physical Layer Procedures for NR V2X Sidelink, 33rd Generation Partnership Project (3GPP), Mobile Competence Centre, 650, Route Des Lucioles, F-06921 Sophia, vol. RAN WG1, No. Athens, Greece, Feb. 25, 2019- Mar. 1, 2019, Feb. 16, 2019 (Feb. 16, 2019), XP051600289, 9 pages, Retrieved from the Internet: URL: http://www.3gpp.org/ftp/tsg%5Fran/WG1%5FRL1/TSGR1%5F96/Docs/R1%2D1902596%2Ezip. [retrieved on Feb. 16, 2019] sections 1 - 3.
(Continued)

*Primary Examiner* — Pao Sinkantarakorn
(74) *Attorney, Agent, or Firm* — Holland & Hart LLP

(57) ABSTRACT

Methods, systems, and devices for wireless communications are described. A set of reference signal resources that are configured for sounding reference signal transmissions may be shared among user equipments (UEs) that are enabled to
(Continued)

receive multicast communications. Each of the shared set of reference signal resources may be associated with set(s) of channel state information. UEs may measure a multicast channel to determine channel state information for the multicast channel and transmit sounding reference signals over one of the shared reference signal resources that is associated with the set of channel state information determined by the UE. A base station that receives the sounding reference signal may transmit a subsequent multicast transmission for the UEs using transmission parameters that are adapted for the set(s) of channel state information associated with the occupied sounding reference signal resource.

30 Claims, 13 Drawing Sheets

(51) Int. Cl.
*H04W 24/08* (2009.01)
*H04L 12/18* (2006.01)

(58) Field of Classification Search
CPC .... H04L 12/189; H04L 25/0224; H04W 4/06; H04W 24/08
See application file for complete search history.

(56) References Cited

U.S. PATENT DOCUMENTS

| | | |
|---|---|---|
| 2019/0109679 A1 | 4/2019 | Liu et al. |
| 2019/0174440 A1 | 6/2019 | Kwak et al. |
| 2019/0273637 A1* | 9/2019 | Zhang .................. H04L 5/0094 |
| 2020/0235802 A1* | 7/2020 | Nilsson ............... H04L 25/0226 |
| 2020/0336264 A1* | 10/2020 | Faxer .................... H04L 5/0048 |
| 2020/0396046 A1* | 12/2020 | Kwon .................. H04L 5/0094 |

OTHER PUBLICATIONS

International Search Report and Written Opinion—PCT/US2020/060620—ISA/EPO—dated Feb. 12, 2021 (200505WO).
Qualcomm Incorporated: "Maintenance for CSI Reporting," 3GPP Draft, 3GPP TSG RAN WG1 Meeting #93, R1-1807340, 3RD Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018 (May 20, 2018), XP051442532, 6 pages, Retrieved from the Internet: URL: http://www.3gpp.org/ftp/Meetings%5F3GPP%5FSYNC/RAN1/Docs/ [retrieved on May 20, 2018] the whole document, Section 3.1-3.4.

* cited by examiner

MULTICAST FEEDBACK BASED ON REFERENCE SIGNAL TRANSMISSIONS

CROSS REFERENCE

The present application for patent claims the benefit of U.S. Provisional Patent Application No. 62/935,945 by TAKEDA et al., entitled "MULTICAST FEEDBACK BASED ON REFERENCE SIGNAL TRANSMISSIONS," filed Nov. 15, 2019, assigned to the assignee hereof, and expressly incorporated by reference herein.

FIELD OF TECHNOLOGY

The following relates generally to wireless communications and more specifically to techniques for reporting multicast feedback based on reference signal transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may perform a transmission that carries one or more sets of data that are each intended for a respective UE. Such a transmission may be referred to as a unicast transmission. Additionally, or alternatively, a base station may perform a transmission that carries a set of data that is intended for multiple UEs. Such a transmission may be referred to as a multicast transmission.

SUMMARY

The described techniques relate to improved methods, systems, devices, and apparatuses that support reporting multicast feedback based on reference signal transmissions. In some cases, a set of uplink communication resources may be shared among multicast-enabled user equipments (UEs), where each uplink communication resource may be configured to be associated with particular set(s) of channel state information. Based on the association, a UE may indicate channel state information measured by the UE by transmitting over an uplink communication resource that is associated with the measured channel state information.

For example, a set of reference signal resources may be shared among multicast-enabled or multicast-configured UEs, and each sounding reference signal resource may be configured to be associated with a particular set of channel state information. The multicast-enabled or multicast-configured UEs may transmit sounding reference signals over the shared set of reference signal resources based on channel state information determined by the multicast-enabled or configured UEs. For example, after determining a set of channel state information, a multicast-enabled or configured UE may select a reference signal resource that is associated with the channel state information. In some cases, the reference signal resource may be associated with (e.g., logically assigned to) the same set of channel state information determined by the multicast-enabled or configured UE. In other cases, the reference signal resource may be associated with (e.g., logically assigned to) multiple sets of channel state information that include the set of channel state information determined by the multicast-enabled or configured UE. After selecting the reference signal resource, the multicast-enabled or configured UE may transmit a sounding reference signal over the selected sounding reference signal resource. In some cases, a multicast-enabled or configured UE transmits a sounding reference signal over a sounding reference signal resource after failing to receive or decode a multicast transmission to indicate a negative acknowledgment in addition to channel state information.

A method of wireless communications at a UE is described. The method may include receiving an indication of uplink reference signal resources for transmission by the UE of sounding reference signals, the uplink reference signal resources for UEs associated with multicast communications, measuring one or more multicast channels monitored by the UE to determine a set of channel state information for UE receipt of the multicast communications, selecting one of the uplink reference signal resources based on an association between the set of channel state information and the one of the uplink reference signal resources, and transmitting a sounding reference signal over the one of the uplink reference signal resources.

An apparatus for wireless communications at a UE is described. The apparatus may include a processor, memory coupled with the processor, and instructions stored in the memory. The instructions may be executable by the processor to cause the apparatus to receive an indication of uplink reference signal resources for transmission by the UE of sounding reference signals, the uplink reference signal resources for UEs associated with multicast communications, measure one or more multicast channels monitored by the UE to determine a set of channel state information for UE receipt of the multicast communications, select one of the uplink reference signal resources based on an association between the set of channel state information and the one of the uplink reference signal resources, and transmit a sounding reference signal over the one of the uplink reference signal resources.

Another apparatus for wireless communications at a UE is described. The apparatus may include means for receiving an indication of uplink reference signal resources for transmission by the UE of sounding reference signals, the uplink reference signal resources for UEs associated with multicast communications, measuring one or more multicast channels monitored by the UE to determine a set of channel state information for UE receipt of the multicast communications, selecting one of the uplink reference signal resources based on an association between the set of channel state information and the one of the uplink reference signal resources, and transmitting a sounding reference signal over the one of the uplink reference signal resources.

A non-transitory computer-readable medium storing code for wireless communications at a UE is described. The code may include instructions executable by a processor to receive an indication of uplink reference signal resources for transmission by the UE of sounding reference signals, the uplink reference signal resources for UEs associated with multicast communications, measure one or more multicast channels monitored by the UE to determine a set of channel state information for UE receipt of the multicast communications, select one of the uplink reference signal resources based on an association between the set of channel state information and the one of the uplink reference signal resources, and transmit a sounding reference signal over the one of the uplink reference signal resources.

In some examples of the method, apparatuses, and non-transitory computer-readable medium described herein, the selecting may include operations, features, means, or instructions for identifying the one of the uplink reference signal resources based on the set of channel state information determined by the UE.

Some examples of the method, apparatuses, and non-transitory computer-readable medium described herein may further include operations, features, means, or instructions for determining that the set of channel state information includes a channel state information (CSI)-reference signal index, a precoding matrix index, and a channel quality index, and identifying the one of the uplink reference signal resources as being associated with the CSI-reference signal index, the precoding matrix index, and the channel quality index.

Some examples of the method, apparatuses, and non-transitory computer-readable medium described herein may further include operations, features, means, or instructions for identifying a set of the uplink reference signal resources that may be associated with one or more CSI-reference signal indices, where the one of the uplink reference signal resources may be selected from the set of the uplink reference signal resources.

Some examples of the method, apparatuses, and non-transitory computer-readable medium described herein may further include operations, features, means, or instructions for identifying a set of the uplink reference signal resources that may be associated with one or more precoding matrix indices, where the one of the uplink reference signal resources may be selected from the set of the uplink reference signal resources.

Some examples of the method, apparatuses, and non-transitory computer-readable medium described herein may further include operations, features, means, or instructions for identifying a set of the uplink reference signal resources that may be associated with one or more channel quality indices, where the one of the uplink reference signal resources may be selected from the set of the uplink reference signal resources.

Some examples of the method, apparatuses, and non-transitory computer-readable medium described herein may further include operations, features, means, or instructions for determining that the set of channel state information includes a CSI-reference signal index, and identifying a set of the uplink reference signal resources that may be associated with the CSI-reference signal index, where the one of the uplink reference signal resources may be selected from the set of the uplink reference signal resources.

Some examples of the method, apparatuses, and non-transitory computer-readable medium described herein may further include operations, features, means, or instructions for determining that the set of channel state information includes a precoding matrix index, and identifying, from the set of the uplink reference signal resources, a subset of the uplink reference signal resources that may be associated with a first set of precoding matrix indices including the precoding matrix index, where the one of the uplink reference signal resources may be selected from the subset of the uplink reference signal resources.

Some examples of the method, apparatuses, and non-transitory computer-readable medium described herein may further include operations, features, means, or instructions for determining that the set of channel state information includes a channel quality index, and identifying, from the subset of the uplink reference signal resources, a first uplink reference signal resource that may be associated with a first set of channel quality indices including the channel quality index, where the first uplink reference signal resource may be selected as the one of the uplink reference signal resources.

Some examples of the method, apparatuses, and non-transitory computer-readable medium described herein may further include operations, features, means, or instructions for identifying, from the subset of the uplink reference signal resources, a second uplink reference signal resource that may be associated with a second set of channel quality indices including the channel quality index, where the first uplink reference signal resource or the second uplink reference signal resource may be selected as the one of the uplink reference signal resources.

Some examples of the method, apparatuses, and non-transitory computer-readable medium described herein may further include operations, features, means, or instructions for determining that a condition of the one or more multicast channels may have changed by a threshold amount, where the UE may be associated with a second group of UEs based on the condition changing by the threshold amount, and selecting a different uplink reference signal resource of the uplink reference signal resources based on being associated with the second group of UEs.

Some examples of the method, apparatuses, and non-transitory computer-readable medium described herein may further include operations, features, means, or instructions for receiving a first multicast transmission using a first set of transmission parameters, where transmitting the sounding reference signal indicates that the first multicast transmission may have been unsuccessfully decoded, and receiving, based on transmitting the sounding reference signal, a second multicast transmission that may be transmitted based on the association between the set of channel state information and the one of the uplink reference signal resources.

In some examples of the method, apparatuses, and non-transitory computer-readable medium described herein, the receiving may include operations, features, means, or instructions for receiving the second multicast transmission over a transmission beam indicated by the association between the set of channel state information and the one of the uplink reference signal resources.

In some examples of the method, apparatuses, and non-transitory computer-readable medium described herein, the receiving may include operations, features, means, or instructions for receiving the second multicast transmission using a modulation and coding scheme indicated by the association between the set of channel state information and the one of the uplink reference signal resources.

In some examples of the method, apparatuses, and non-transitory computer-readable medium described herein, the second multicast transmission includes a retransmission of data included in the first multicast transmission.

Some examples of the method, apparatuses, and non-transitory computer-readable medium described herein may further include operations, features, means, or instructions for determining associations between each of the uplink reference signal resources and sets of channel state information, where the one of the uplink reference signal resources may be selected based on the associations.

In some examples of the method, apparatuses, and non-transitory computer-readable medium described herein, determining the associations may include operations, features, means, or instructions for a first set of the uplink reference signal resources may be associated with a first CSI-reference signal index, a second set of the uplink reference signal resources may be associated with a second CSI-reference signal index, a first subset of the first set of the uplink reference signal resources may be associated with a first set of precoding matrix indices, a second subset of the first set of the uplink reference signal resources may be associated with a second set of precoding matrix indices, a first uplink reference signal resource of the first subset of the first set of the uplink reference signal resources may be associated with a first set of channel quality indices, and a second uplink reference signal resource of the first subset of the first set of the uplink reference signal resources may be associated with a second set of channel quality indices.

In some examples of the method, apparatuses, and non-transitory computer-readable medium described herein, the first set of the uplink reference signal resources corresponds to a first group of UEs based on the first CSI-reference signal index indicating a first transmission beam, and the second set of the uplink reference signal resources corresponds to a second group of UEs based on the second CSI-reference signal index indicating a second transmission beam.

Some examples of the method, apparatuses, and non-transitory computer-readable medium described herein may further include operations, features, means, or instructions for receiving an indication of the associations in a radio resource control message or a physical downlink control channel message.

Some examples of the method, apparatuses, and non-transitory computer-readable medium described herein may further include operations, features, means, or instructions for measuring a set of CSI-reference signals transmitted over the one or more multicast channels, and determining the set of channel state information based on the set of CSI-reference signals.

Some examples of the method, apparatuses, and non-transitory computer-readable medium described herein may further include operations, features, means, or instructions for receiving, from a base station, an indication of one or more CSI-reference signals to measure.

Some examples of the method, apparatuses, and non-transitory computer-readable medium described herein may further include operations, features, means, or instructions for determining, by the UE, a quantity of CSI-reference signals to measure, and selecting the set of CSI-reference signals based on the determining, the set of CSI-reference signals including the quantity of CSI-reference signals.

Some examples of the method, apparatuses, and non-transitory computer-readable medium described herein may further include operations, features, means, or instructions for receiving, from a base station, an indication of the quantity of CSI-reference signals for the UE to measure; or, and transmitting, to the base station, the indication of the quantity of CSI-reference signals measured by the UE.

Some examples of the method, apparatuses, and non-transitory computer-readable medium described herein may further include operations, features, means, or instructions for measuring a set of demodulation reference signals transmitted over the one or more multicast channels, the set of demodulation reference signals being associated with a set of precoding resource block groups, and determining the set of channel state information based on the set of demodulation reference signals.

Some examples of the method, apparatuses, and non-transitory computer-readable medium described herein may further include operations, features, means, or instructions for determining that a demodulation reference signal of the set of demodulation reference signals may have a highest signal-to-noise ratio based on the measuring, the demodulation reference signal being associated with a precoding resource block group, and identifying a set of the uplink reference signal resources that may be associated with the precoding resource block group based on the determining, where the one of the uplink reference signal resources may be selected from the set of the uplink reference signal resources.

Some examples of the method, apparatuses, and non-transitory computer-readable medium described herein may further include operations, features, means, or instructions for determining, for the set of channel state information, a precoding matrix indicator, channel quality indicator, or channel state information-reference signal resource indicator, or any combination thereof, based on measuring the one or more multicast channels.

Some examples of the method, apparatuses, and non-transitory computer-readable medium described herein may further include operations, features, means, or instructions for receiving a radio resource control message including the indication of the uplink reference signal resources, and determining, based on the radio resource control message, that the uplink reference signal resources occur periodically, where the sounding reference signal may be transmitted in one instance of the periodic reference signal resources.

Some examples of the method, apparatuses, and non-transitory computer-readable medium described herein may further include operations, features, means, or instructions for receiving a control element in a multicast data channel, where transmitting the sounding reference signal may be based on receiving the control element.

Some examples of the method, apparatuses, and non-transitory computer-readable medium described herein may further include operations, features, means, or instructions for receiving a downlink control information format that schedules a multicast data channel, where transmitting the sounding reference signal may be based on receiving the downlink control information format.

Some examples of the method, apparatuses, and non-transitory computer-readable medium described herein may further include operations, features, means, or instructions for receiving a multicast data channel over the one or more multicast channels, and transmitting the sounding reference signal based on failing to decode multicast data conveyed in the multicast data channel.

Some examples of the method, apparatuses, and non-transitory computer-readable medium described herein may further include operations, features, means, or instructions for determining that transmitting the sounding reference signal over the one of the uplink reference signal resources conflicts with transmitting an uplink control channel or uplink data channel, and prioritizing the sounding reference signal over the uplink control channel or uplink data channel by transmitting the reference signal and dropping the transmission of the uplink control channel or uplink data channel.

Some examples of the method, apparatuses, and non-transitory computer-readable medium described herein may further include operations, features, means, or instructions for receiving a re-transmission of the multicast data based on transmitting the sounding reference signal.

A method of wireless communications at a base station is described. The method may include transmitting, over a multicast channel, an indication of uplink reference signal resources for transmission of sounding reference signals, the uplink reference signal resources to be shared by a set of UEs associated with multicast communication, receiving, from a UE, a sounding reference signal over one of the uplink reference signal resources, the one of the uplink reference signal resources associated with a set of channel state information for the UE, and transmitting, over the multicast channel, multicast data based on the set of channel state information for the UE.

An apparatus for wireless communications at a base station is described. The apparatus may include a processor, memory coupled with the processor, and instructions stored in the memory. The instructions may be executable by the processor to cause the apparatus to transmit, over a multicast channel, an indication of uplink reference signal resources for transmission of sounding reference signals, the uplink reference signal resources to be shared by a set of UEs associated with multicast communication, receive, from a UE, a sounding reference signal over one of the uplink reference signal resources, the one of the uplink reference signal resources associated with a set of channel state information for the UE, and transmit, over the multicast channel, multicast data based on the set of channel state information for the UE.

Another apparatus for wireless communications at a base station is described. The apparatus may include means for transmitting, over a multicast channel, an indication of uplink reference signal resources for transmission of sounding reference signals, the uplink reference signal resources to be shared by a set of UEs associated with multicast communication, receiving, from a UE, a sounding reference signal over one of the uplink reference signal resources, the one of the uplink reference signal resources associated with a set of channel state information for the UE, and transmitting, over the multicast channel, multicast data based on the set of channel state information for the UE.

A non-transitory computer-readable medium storing code for wireless communications at a base station is described. The code may include instructions executable by a processor to transmit, over a multicast channel, an indication of uplink reference signal resources for transmission of sounding reference signals, the uplink reference signal resources to be shared by a set of UEs associated with multicast communication, receive, from a UE, a sounding reference signal over one of the uplink reference signal resources, the one of the uplink reference signal resources associated with a set of channel state information for the UE, and transmit, over the multicast channel, multicast data based on the set of channel state information for the UE.

Some examples of the method, apparatuses, and non-transitory computer-readable medium described herein may further include operations, features, means, or instructions for determining a set of transmission parameters for transmitting the multicast data based on the set of channel state information.

Some examples of the method, apparatuses, and non-transitory computer-readable medium described herein may further include operations, features, means, or instructions for receiving, from a second UE, a second sounding reference signal over another one of the uplink reference signal resources and concurrently with the sounding reference signal, the other one of the uplink reference signal resources being associated with a second set of channel state information, and determining a set of transmission parameters for transmitting the multicast data based on the set of channel state information and the second set of channel state information.

Some examples of the method, apparatuses, and non-transitory computer-readable medium described herein may further include operations, features, means, or instructions for receiving, from a second UE after transmitting the multicast data, a second sounding reference signal over another one of the uplink reference signal resources, the other one of the uplink reference signal resources being associated with a second set of channel state information, determining a second set of transmission parameters for transmitting second multicast data based on the second set of channel state information, and transmitting the second multicast data using the second set of transmission parameters based on the determining.

Some examples of the method, apparatuses, and non-transitory computer-readable medium described herein may further include operations, features, means, or instructions for receiving, from a set of UEs after transmitting the multicast data, a set of sounding reference signals over a set of the uplink reference signal resources, the set of the uplink reference signal resources being associated with a set of sets of channel state information, and determining a set of transmission parameters for transmitting second multicast data independent of the set of sets of channel state information based on the set of sets of channel state information including different CSI-reference signal indices.

Some examples of the method, apparatuses, and non-transitory computer-readable medium described herein may further include operations, features, means, or instructions for transmitting an indication of associations between the uplink reference signal resources and sets of channel state information.

Some examples of the method, apparatuses, and non-transitory computer-readable medium described herein may further include operations, features, means, or instructions for transmitting an indication of a set of CSI-reference signals for the UE to measure or a quantity of CSI-reference signals for the UE to measure.

Some examples of the method, apparatuses, and non-transitory computer-readable medium described herein may further include operations, features, means, or instructions for receiving an indication of a quantity of CSI-reference signals measured by the UE.

In some examples of the method, apparatuses, and non-transitory computer-readable medium described herein, the uplink reference signal resources includes a first set of uplink reference signal resources associated with a first precoding resource block group and a second set of uplink reference signal resources associated with a second precoding resource block group, and receiving the sounding reference signal may include operations, features, means, or instructions for receiving the sounding reference signal over the first set of uplink reference signal resources associated with the first precoding resource block group, the first precoding resource block group being associated with the set of channel state information.

Some examples of the method, apparatuses, and non-transitory computer-readable medium described herein may further include operations, features, means, or instructions for determining a precoding matrix for transmitting the multicast data based on receiving the sounding reference signal over the first set of uplink reference signal resources associated with the first precoding resource block group.

Some examples of the method, apparatuses, and non-transitory computer-readable medium described herein may further include operations, features, means, or instructions for transmitting a radio resource control message indicating that the uplink reference signal resources may be configured to occur periodically, where the sounding reference signal may be received in one instance of the periodic uplink reference signal resources.

Some examples of the method, apparatuses, and non-transitory computer-readable medium described herein may further include operations, features, means, or instructions for transmitting a control element in a multicast data channel, where the sounding reference signal may be received based on transmitting the control element.

Some examples of the method, apparatuses, and non-transitory computer-readable medium described herein may further include operations, features, means, or instructions for transmitting a downlink control information format that schedules a multicast data channel, where the sounding reference signal may be received based on transmitting the downlink control information format.

Some examples of the method, apparatuses, and non-transitory computer-readable medium described herein may further include operations, features, means, or instructions for determining, based on receiving the sounding reference signal, that the UE failed to decode an initial transmission of the multicast data, where the transmission of the multicast data includes a retransmission of the multicast data and may be based on the determination.

DETAILED DESCRIPTION

Figure 1:
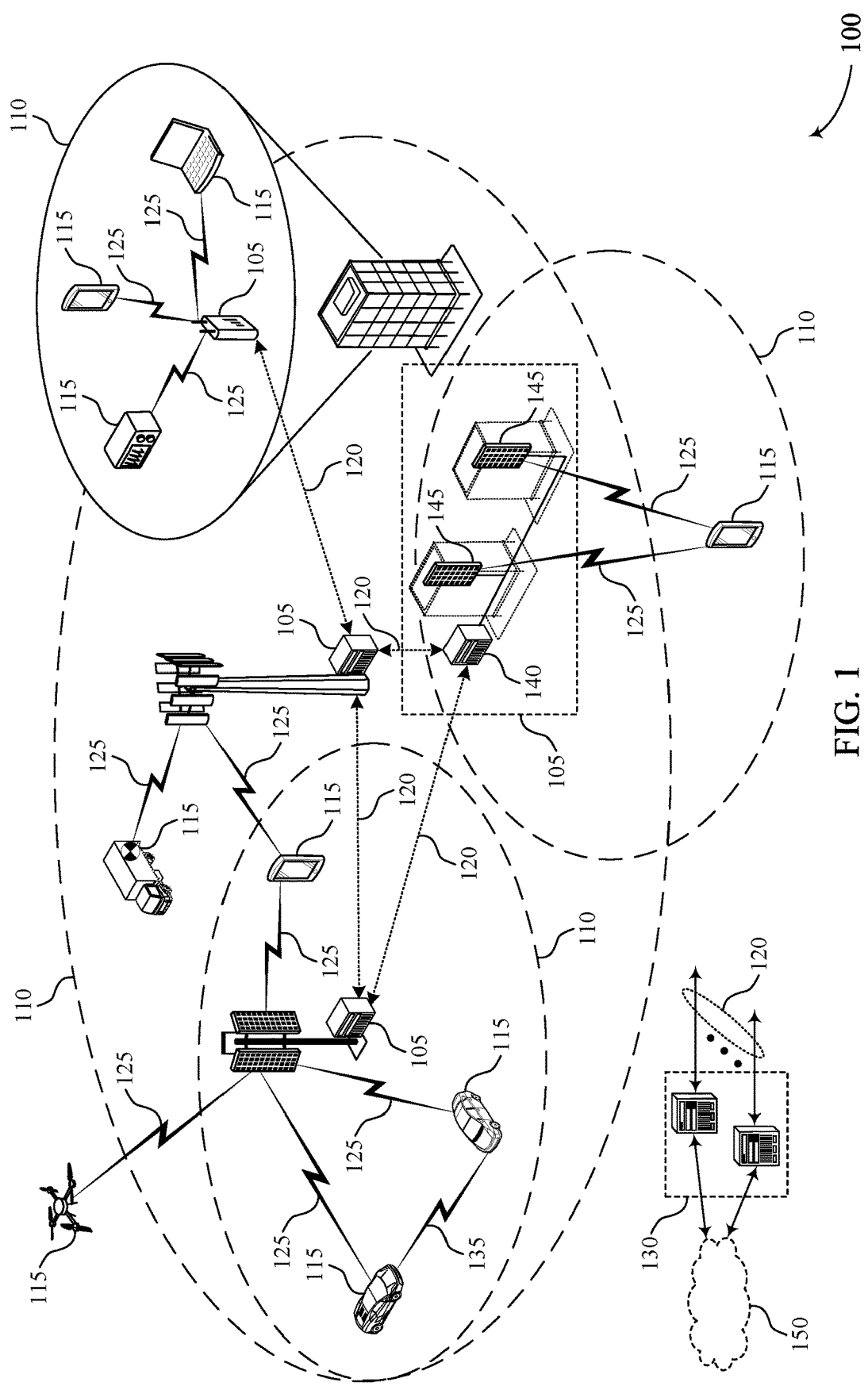
FIG. 1 illustrates an example of a wireless communications system that supports reporting multicast feedback based on reference signal transmissions in accordance with aspects of the present disclosure.

In some cases, a wireless communications system may support both unicast and multicast transmissions for communication between devices (e.g., a base station and user equipment (UE)). Unicast transmissions may involve transmitting sets of data that are intended for individual UEs. Multicast transmissions may involve transmitting a set of data that is intended for multiple UEs. In some cases, while performing unicast transmissions, a base station may be provided with channel information (e.g., location information, channel condition information, etc.) for each UE that receives or is scheduled to receive a unicast transmission. By contrast, a base station performing multicast transmission may not be provided with channel information for UEs that receive a multicast transmission—e.g., the UEs may autonomously access multicast communication resources without coordination with the base station.

In some cases, signaling and reporting techniques (e.g., UE-specific reference signal transmissions, channel state information (CSI) reporting, hybrid automatic repeat request (HARQ) feedback reporting, etc.) for improving the reliability or efficiency of unicast communications may not be used to improve multicast communications. For example, using the unicast signaling and reporting techniques in a multicast environment may result in excessive signaling overhead. In another example, the unicast signaling and reporting techniques may not be used for multicast communication because the unicast techniques may not be supported in a multicast environment. That is, certain unicast techniques may rely on a base station being provided with channel information for individual UEs, enabling a base station to use tailored transmission parameters for subsequent transmissions to the individual UEs.

Failing to utilize the unicast signaling and reporting techniques may result in multicast communications having decreased reliability and/or efficiency. For example, a failure to support the reporting of channel information for multicast communications may prevent a base station from determining channel conditions for UEs that are receiving a multicast transmission. Thus, a base station performing multicast communications may be unable to customize (e.g., by beamforming, identifying a modified modulation and coding scheme (MCS), identifying a modified transmission parameter, etc.) multicast transmissions for the UEs that are actually receiving the multicast transmission. Also, a failure to support HARQ feedback reporting for multicast communications may prevent a base station from performing HARQ retransmissions to UEs that failed to receive an initial data transmission. In some cases, the UE may perform soft-combining between the initial data transmission and retransmission. In other cases, the UE may not perform soft-combining between the initial data transmission and retransmission. If, however, HARQ feedback reporting is supported for multicast communication, a failure to support the reporting of channel information may prevent a base station from performing HARQ retransmissions that are adapted to the UEs that actually failed to receive an initial HARQ transmission.

To increase the reliability and/or efficiency of multicast transmissions, signaling and reporting techniques used to determine multicast channel information for UEs operating in a multicast environment may be implemented.

In some examples, adaptive multicast transmissions may be supported by configuring a set of sounding reference signal (SRS) resources so that each SRS resource is associated with a particular set of CSI. The set of SRS resources may be shared by multicast-enabled UEs and the UEs that receive the multicast transmissions may transmit an SRS over a particular shared SRS resource based on individual channel estimates determined by the UEs. Thus, a base station may determine channel information for the UEs—e.g., based on averaging the CSI indicated by the occupied shared SRS resources—and thus, may determine characteristics of a multicast channel between the base station and the UEs receiving the multicast transmission. After determining the multicast channel information, the base station may adapt subsequent multicast transmission to conform to the determined multicast channel.

In some examples, adaptive multicast retransmissions may be supported by configuring the multicast-enabled UEs to transmit an SRS only after failing to receive a multicast transmission. This way, a base station may determine channel information for the UEs, characteristics of the multicast channel, and the reception status of a multicast transmission all based on SRSs. Accordingly, the base station may adapt a multicast retransmission to conform to the determined multicast channel.

Aspects of the disclosure are initially described in the context of wireless communications systems. Aspects of the disclosure are further illustrated by and described with reference to apparatus diagrams, system diagrams, and flowcharts that relate to techniques for implicit channel state information reporting for multicast.

FIG. 1 illustrates an example of a wireless communications system 100 that supports techniques for reporting multicast feedback based on reference signal transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, such as wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a wireless communications system 100 may be configured to perform multiple transmissions each carrying data for a particular UE 115. Such transmissions may be referred to as unicast transmissions. For example, a base station 105 may perform a first transmission that conveys first data to a first UE 115 located within a coverage area 110 over a set of frequency resources and a second transmission that conveys second data to a second UE 115 located within the coverage area 110 over the same frequency resources. In some cases, transmissions between a base station 105 and a UE 115 may fail—e.g., a receiving device may fail to detect and/or decode a transmission from a transmitting device. In some cases, transmission failures may be due to characteristics of a channel between the base station 105 and the UE 115—e.g., the channel may introduce excessive delay or shift the phase of a transmission. In some cases, transmission failures may be due to interference on a channel between the base station 105 and the UE 115—e.g., nearby transmissions or physical objects may interfere with the channel.

To increase the reliability of wireless unicast communications, a wireless communications system 100 may use reference signals that indicate characteristics (or a state) of a channel between a transmitting and receiving device. In some examples, a receiving device may use reference signals to estimate a state of a channel between the transmitting and receiving device. After estimating a channel between itself and a transmitting device, a wireless device may update parameters for receiving signals (or "receiver parameters") to account for properties of the channel. Also, a receiving device (e.g., a UE 115) may report information about the estimated channel to a transmitting device (e.g., a base station 105)—e.g., in a CSI report. A transmitting device that receives a CSI report may use the included channel information to modify transmission parameters to conform the transmission to the channel. Reference signals used by a wireless communications system 100 may include CSI-RS, demodulation reference signal (DMRS), and SRS.

A base station 105 may transmit CSI-RSs to UEs within a coverage area 110 of base station 105 using scheduled downlink communication resources. In some cases, a common set of CSI-RSs is transmitted across a coverage area 110 of a base station 105. In some cases, the base station 105 may transmit multiple sets of common CSI-RSs across a coverage area 110 using multiple transmission beams. In some cases, a UE may be configured to monitor a particular quantity of CSI-RSs within a time period.

A UE 115 that receives CSI-RSs may use the CSI-RSs to estimate a channel between the UE 115 and the base station 105. To estimate the channel, the UE may measure aspects of the received CSI-RSs (including a SNR, signal-to-interference-to noise ratio (SINR), and phase of the received CSI-RS) and compare the measured aspects with transmission parameters used for transmitting the CSI-RSs. In some cases, the UE 115 may be provided with the transmission parameters prior to the transmission of the CSI-RSs—e.g., in an initial setup message, such as a radio resource control (RRC) message. In some cases, the UE 115 may determine multiple channel estimates based on received CSI-RSs—e.g., one channel estimate for each transmission beam used to transmit the CSI-RSs.

After determining the channel estimate(s), the UE 115 may determine a quality of the channel, a desired precoding matrix for the channel, and/or a desired transmission beam for receiving subsequent transmissions from a base station 105. In some cases, the UE 115 may determine the quality of the channel by mapping a measured SNR value to a channel quality index included in a list of channel quality indices—e.g., the UE 115 may map a measured SNR value of 6 dB to a second channel quality indicator (CQI) index (or CQI_2). In some cases, the UE 115 determines the desired precoding matrix using a codebook that maps the measured channel characteristics to a precoding matrix that is adapted for the channel. In some examples, the determined precoding matrix corresponds to a precoding matrix index. And in some cases, the UE 115 determines the desired transmission beam based on determining the CSI-RSs with the highest SNR and the transmission beam that corresponds to the CSI-RS(s) with the highest SNR. In some cases, the determined transmission beam corresponds to a transmission beam index.

After determining a channel quality index, a precoding matrix index, and/or a transmission beam index, the UE 115 may report the channel quality index, the precoding matrix index, and/or the transmission beam index to the base station in a CSI report—e.g., using a CQI field, a PMI field, and/or a CSI-RS resource indicator (CRI) field. A CSI report may also be referred to as CSI feedback. In some cases, the UE 115 may send an explicit indication of the CSI report over physical uplink control channel (PUCCH) resources that are allocated to the UE 115. After receiving a CSI report, a base station 105 may adapt subsequent transmissions to a UE 115 based on the indices indicated in the CQI, PMI, and CRI fields. For example, in a subsequent transmission, the base station may use an MCS corresponding to the CQI index, a precoding matrix corresponding to the PMI index, and a transmission beam corresponding to the CRI index.

A base station 105 may also transmit DMRSs to UEs 115. In some cases, a set of DMRSs may be configured for a particular UE 115 and may be transmitted using, or alongside, physical downlink shared channel (PDSCH) resources that are allocated to the UE 115—e.g., DMRS resources may be interleaved with PDSCH resources for a UE 115. In some cases, DMRSs may be transmitted over a particular transmission beam—e.g., a same transmission beam as the transmission beam used for a data transmission to a UE. A UE 115 that receives DMRSs may use the DMRSs to estimate a channel between the UE 115 and the base station 105, as similarly discussed with reference to CSI-RS. In some cases, DMRSs are used to determine an instantaneous SINR for a channel. Unlike CSI-RSs, a UE 115 may use DMRS to decode a received downlink data transmission instead of using the DMRSs to report channel information.

In some cases, a UE 115 may transmit reference signals to a base station 105 to assist the base station 105 with channel estimation. For example, a UE 115 may send an uplink SRS over the system bandwidth so that a base station 105 can select optimal frequencies for communication with the UE 115. For instance, the base station 105 may measure the SRS to determine the received signal power across the system bandwidth and then use the information to implement frequency dependent scheduling of the UE 115. In some examples, a UE 115 may transmit SRSs in SRS resources (e.g., uplink communication resources scheduled for SRS) that occur periodically. For example, the SRS resources (which may also be referred to as SRS transmission occasions) may occur in every nth subframe. In some examples, the SRS resources are located in the last symbol of an uplink subframe. However, other locations of SRS are possible. In some examples, multiple UEs 115 are configured to transmit SRSs over different (e.g., non-overlapping) sets of communication resources—e.g., to prevent interference between SRS transmissions.

To further increase the reliability of wireless unicast communications, a wireless communications system 100 may be configured to support the retransmission of failed transmissions (e.g., the wireless communications system 100 may support HARQ operation). In some cases, to support retransmissions, UEs 115 may report whether a received transmission (which may be an initial transmission) was successfully decoded or an expected transmission was not received (or detected). For example, a UE 115 may report to a base station 105 that a transmission was successfully received and decoded by transmitting a positive acknowledgment (ACK) message. Alternatively, the UE 115 may report to a base station 105 that a transmission was not received or was unsuccessfully decoded by transmitting a negative acknowledgment (NACK) message. In some cases, each UE 115 may be configured with uplink control channel resources (e.g., PUCCH resources) for transmitting acknowledgement feedback. After receiving a NACK message, a base station 105 may retransmit data included in the failed transmission to the UE 115. In some cases, the UE 115 may transmit the acknowledgment feedback over a PUCCH resources that is allocated to the UE 115 for reporting acknowledgment feedback.

In some cases, the base station 105 may retransmit the data using the same transmission parameters that were used for the failed transmission. But using the same transmission parameters may result in a failure of the retransmission—e.g., if long-term interference caused the previous transmission to fail. In other cases, the base station 105 may perform the retransmission using different transmission parameters (e.g., a lower MCS, a higher transmit power, etc.) than the transmission parameters used for the failed transmission. Performing retransmissions using modified transmission parameters may be referred to as adaptive retransmission, adaptive HARQ operation, and the like. In some cases, the base station 105 selects the transmission parameters for the retransmission based on channel information reported by a UE 115 that also reports a failed transmission. For example, the base station 105 may perform the retransmission using an MCS that corresponds to a reported CQI index, a precoding matrix that corresponds to a reported PMI index, and a transmission beam that corresponds to a reported CRI index.

In some cases, to increase the reliability of wireless unicast communications, a wireless communications system 100 may perform data transmission over multiple precoding resource block groups (PRGs)—e.g., to mitigate the effects of interference on one of the PRGs. In some examples, a base station 105 may transmit data over a first set of PDSCH resources using a first precoding matrix and/or beamforming (a first PRG), a second set of PDSCH resources using a second precoding matrix and/or beamforming (a second PRG), and a third set of PDSCH resources using a third precoding matrix and/or beamforming (a third PRG). In some cases, a DMRS may be included in each of the sets of PDSCH resources. In some cases, a UE 115 may receive the data transmission over one or more of the PRGs and be configured to report HARQ feedback for the data transmission over multiple sets of PUCCH resources—e.g., the UE 115 may be configured to report feedback for the portion of the data transmission using the first PRG over a first set of PUCCH resources, the portion of the data transmission using the second PRG over a second set of PUCCH resources, and so on. In some cases, the UE 115 receives each portion of the data transmission based on the corresponding DMRSs included in the corresponding sets of PDSCH resources.

In some cases, a wireless communications system 100 may be configured to perform a single transmission carrying a set of data that is intended for multiple UEs 115. Such a transmission may be referred to as a multicast transmission. For example, a base station 105 may perform a multicast transmission that reaches (or is detectable) across a coverage area 110. That is, a multicast transmission may be received by any authorized UE 115 within the coverage area 110. In some cases, a multicast transmission includes data for a live broadcast to be simultaneously received and displayed to individual users that have tuned into the multicast transmission. In some cases, the UEs 115 receiving the multicast transmission may be distributed throughout the coverage area 110 and implicitly arranged into groups—e.g., based on different regions of the coverage area 110. In some cases, one or more UEs 115 may fail to receive a multicast transmission while other UEs 115 may successfully receive the multicast transmission—e.g., due to localized interference on a channel between the base station 105 and the one or more UEs 115.

Unlike unicast operation, a base station 105 performing multicast operations may be unable to use references signals to determine a channel between the base station 105 and the UEs 115 receiving multicast transmissions. That is, during multicast operation, a base station 105 may not be provided with, or determine, information related to which UEs 115 are currently receiving a multicast transmission. Similarly, the base station 105 may not be provided with, or determine, a location, or general location, of the UEs 115 that are receiving the multicast transmission. Without such UE-specific information, the base station 105 may not support UE-specific transmission techniques during multicast operations. For example, a base station 105 performing multicast operations may not support CSI reporting or the transmission of UE-specific reference signals (e.g., DMRS or SRS).

In some cases, an inability of a base station 105 to determine a location of the UEs 115 that are receiving multicast transmissions may result in reduced reliability transmissions for a majority (or all) of the UEs 115 receiving the multicast transmissions. For example, if a majority (or all) of the UEs 115 receiving multicast transmissions are located in one region of a coverage area 110, a base station 105 performing multicast operations may transmit a multicast transmission that is spread across the entire coverage area 110 rather than a multicast transmission that is adapted for the region where the UEs 115 are located. Also, an inability of a base station 105 to determine channel information for UEs 115 that are receiving multicast transmissions may result in decreased reliability transmissions to a majority (or all) of the UEs 115 receiving the multicast transmissions. That is, a base station 105 performing multicast transmissions may be unable to determine a state of a channel between the base station 105 and the UEs 115 that are receiving the multicast transmissions. Thus, the base station may be prevented from modifying transmission parameters in subsequent transmissions to conform to the channel, and thus the base station is prevented from better serving those UEs 115. Similarly, an inability of a base station 105 to determine a location and/or channel information of the UEs 115 may result in inefficient multicast transmissions. That is, in some cases, a base station 105 may perform a multicast transmission that is sufficient to reach all of the UEs 115 in a coverage area 110 when the base station may perform an equally effective multicast transmission by directing a lower-power multicast transmission to the location of a majority (or all) of the UEs 115.

To increase the reliability and/or efficiency of multicast wireless communications, a base station performing multicast operations may be configured to support the retransmission of failed multicast transmissions—e.g., multicast transmission that are not detected and/or decoded by at least one UE 115 that is currently monitoring a multicast channel. In some cases, to support multicast retransmissions, a base station 105 may configure a multicast uplink PUCCH resource for multicast HARQ feedback for each UE 115 that is authorized to receive a multicast transmission. But allocating a dedicated multicast PUCCH resource to each UE 115 may increase overhead and decrease a throughput of a wireless communications system 100.

In other cases, to support multicast retransmissions, a base station may configure a multicast PUCCH resource for multicast HARQ feedback that is shared by multiple UEs 115. In such examples, any UE 115 within the coverage area 110 may be permitted to transmit a NACK message over the multicast PUCCH resources after failing to receive and/or unsuccessfully decoding an initial multicast transmission. In some cases, if a base station 105 receives a NACK message from at least one UE 115 over the multicast PUCCH resources, the base station 105 may retransmit the failed multicast transmission to all of the UEs 115 within the coverage area 110 using the same transmission parameters. In some examples, the base station 105 may use the same transmission parameters for the multicast retransmission because, without UE-specific channel reporting, the base station 105 may be unable to determine improved transmission parameters for the UE(s) 115 that failed to receive the initial multicast transmission. However, multicast retransmissions that use the same transmission parameters as an initial multicast transmission may fail for the same reasons as the initial multicast transmission. For example, if a long-term blockage (e.g., a physical obstruction) interferes with multicast transmissions to UEs 115 in a particular region of a coverage area 110, both an initial multicast transmission and multicast retransmission may be disrupted by the long-term blockage.

To support adaptive multicast transmissions, techniques for indicating location and/or channel information for UEs 115 that are actually receiving multicast transmissions may be utilized. For example, to support indicating a location of UEs receiving multicast transmissions, shared SRS resources may be configured so that different subsets of the shared resources indicate different locations of the UEs.

Similarly, to support indicating channel information for UEs 115 receiving multicast transmissions, the shared SRS resources may be configured to indicate particular sets of CSI.

To support adaptive multicast retransmissions, techniques for indicating locations and/or channel information for UEs 115 that fail to successfully process multicast transmissions may be utilized. For example, to support indicating a location of UEs (which may correspond to a long-term channel property) that failed to successfully process multicast transmissions, shared uplink resources (e.g., shared SRS resources or shared PUCCH resources for HARQ feedback) may be configured so that different subsets of the shared resources indicate different locations of the UEs. In some cases, shared PUCCH resources for HARQ feedback may be referred to as "shared HARQ resources"). Similarly, to support indicating channel information for UEs that fail to successfully process multicast transmissions, the shared uplink resources may be configured to indicate particular sets of CSI.

Figure 2:
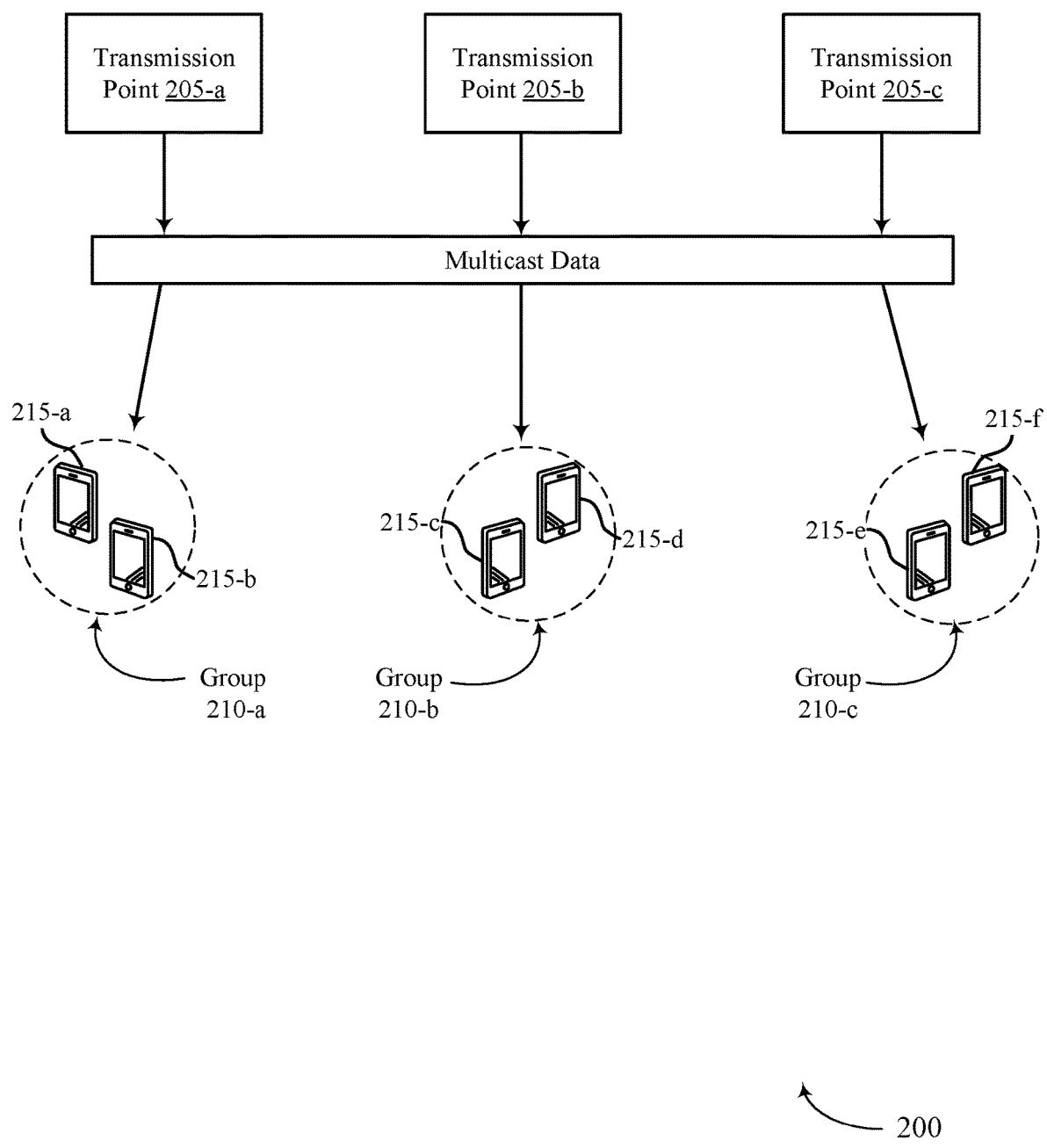
FIG. 2 illustrates an example of a wireless communications system that supports reporting multicast feedback based on reference signal transmissions in accordance with aspects of the present disclosure.

FIG. 2 illustrates an example of a wireless communications system 200 that supports reporting multicast feedback based on reference signal transmissions in accordance with aspects of the present disclosure. Wireless communications system 200 may include transmission points 205-a, 205-b, and 205-c, which may be examples of transmission/reception points of a base station 105 as described with reference to FIG. 1. For instance, a transmission point 205 may be an example of an access network transmission entity 145 as described with reference to FIG. 1. Wireless communications system 200 may also include UE 215-a through UE 215-f, which may be examples of a UE 115 as described with reference to FIG. 1. The UEs 215 may use reference signals, such as SRS, or feedback information, such as HARQ NACKs, to implicitly communicate location information and/or channel information to a base station associated with the transmission points 205.

The transmission points 205 may support a mixed-mode environment in which they work cooperatively to transmit unicast data to a single UE 215 or multicast data to multiple UEs 215. The unicast or multicast data may originate from a base station coupled, co-located, or otherwise associated with the transmission points 205.

When the transmission points 205 transmit unicast data to a UE 215 (e.g., UE 215-a), the reliability of the transmissions may be improved by transmitting SRSs, reporting CSI, and/or initializing HARQ processes, as described above. For example, an initial unicast transmission to UE 215-a may occur over frequencies that are optimal for UE 215-a as determined by a base station measuring SRSs from UE 215-a. Also, the transmission parameters (e.g., beam, precoding matrix, MCS, etc. used for the transmission of the unicast data) may be tailored to the location of UE 215-a and the channel conditions experienced by UE 215-a as indicated by channel information reported by UE 215-a. Further, HARQ feedback from UE 215-a can increase the likelihood that UE 215-a receives the unicast data by prompting a re-transmission of the unicast data when UE 215-a fails to decode the initial transmission. Used collectively, these techniques increase the reliability and efficiency of unicast communications by allowing a base station to 1) use appropriate transmission parameters for initial unicast transmissions and 2) implement adaptive retransmissions.

However, such techniques may not be supported for multicast transmissions, and thus the reliability and efficiency of multicast communications may be inferior relative to that of unicast communications. For example, if wireless communications system 200 does not support SRS transmissions for multicast, the base station may be unable to determine optimal frequencies for the UEs 215. So, the base station may make uninformed selections of transmission frequencies for the UEs 215, which may result in the multicast transmissions experiencing various negative conditions such as interference, noise, etc. Thus, the reliability of multicast communications may suffer when a base station operates without using sounding reference signals.

As another example, consider a transmission of multicast data by transmission points 205-a, 205-b, and 205-c. If wireless communications system 200 is not informed of which UEs 215 are receiving a multicast transmission and/or does not support CSI reporting for multicast, the base station may be ignorant of the location and channel conditions of the UEs 215. Thus, the base station may attempt to reach as many UEs 215 as possible with the transmission by selecting transmission parameters so that the transmission covers a wide geographic area (e.g., is unidirectional) and is robust enough to overcome the worst channel conditions expected by the base station. But a transmission that covers a wide geographic may be unnecessary if the UEs 215 are closely grouped, and a robust transmission may be unneeded if the UEs 215 are experiencing good channel conditions. Thus, various resources (e.g., processing resources, communication resources, etc.) may be wasted when a multicast transmission is performed independent of location and/or channel information.

If wireless communications system 200 does not support HARQ processes for multicast, the base station may be unaware when the initial multicast transmission is unsuccessfully decoded. And if failed multicast transmissions go undetected, the base station may not perform re-transmissions when needed, leading to a loss of information. Thus, the reliability of multicast communications may suffer when HARQ processes are unsupported for multicast. It should be appreciated that even if HARQ processes for multicast are enabled, a base station may still be unable to perform adaptive re-transmissions without enablement of CSI reporting (and vice versa). For example, enabling HARQ processes without CSI reporting may result in multicast data being retransmitted in the same manner as the initial transmission (e.g. unidirectionally) even though only UEs in a particular location (e.g., UEs 215-a and 215-b) failed to decode the initial transmission.

So, it may be desirable for wireless communications system 200 to support CSI reporting, SRS transmissions, and/or HARQ processes for multicast. But implementing CSI reporting, SRS transmissions, and HARQ processes for multicast communications in the same manner as for unicast communications may be undesirable for efficiency and complexity reasons. This is because for unicast communications, the resources for conveying information and signals related to these processes are assigned on a per-UE basis, meaning that each UE 215 is assigned its own resources for CSI reporting, sending SRS, and transmitting HARQ feedback, respectively. When many UEs 215 are in the multicast environment, such an implementation may increase signaling, resource consumption, and complexity to undesirable levels.

According to the techniques described herein, wireless communications system 200, while operating in a multicast mode, may implement SRS transmissions and channel feedback reporting for multicast to determine location and/or channel information for UEs 215 and support adaptive multicast transmissions. For example, wireless communications system 200 may implement joint SRS and CSI reporting for multicast by assigning shared SRS resources to multicast UEs and associating each SRS resource with a particular set of CSI. When a UE 215 sends an SRS on an SRS resource that is associated with CSI determined by that UE 215, a base station may update multicast transmission parameters based on the determined CSI. Thus, the base station may perform a subsequent multicast transmission that is directed to UEs in the same area as the reporting UE 215 and tailored to the channel conditions experienced by those UEs.

As an example, the UEs 215 may be divided into logical groups based on their location and/or channel information. For instance, the UEs 215 may be conceptually divided into group 210-a, group 210-b, and group 210-c. Each group 210 may have a set of transmission parameters that is distinct from the transmission parameters of the other groups 210. For instance, group 210-a may be associated with a first transmission beam in the direction of UE 215-a and UE 215-b, group 210-b may be associated with a second transmission beam in the direction of UE 215-c and UE 215-d, and group 210-c may be associated with a third transmission beam in the direction of UE 215-e and UE 215-f.

The transmission beam and other preferred transmission parameters (e.g., precoding matrix, carrier frequency, MCS, etc.) for a group of UEs 215 may be indicated by a UE 215 in the group 210 transmitting an SRS over an SRS resource that maps to a set of CSI associated with the transmission parameters. For example, UE 215-a may transmit an SRS on an SRS resource that maps to a particular set of CRI, PMI, and CQI determined by UE 215-a. After determining this set of CSI based on the SRS resource, the base station may select multicast transmission parameters for the group 210 in accordance with the CSI. For example, the base station may select the multicast transmission parameters so that a transmission beam indicated by the CRI is used, a precoding matrix indicated by the PMI is used, and an MCS associated with the channel quality indicated by the CQI is used. Thus, a sounding reference signal transmission may be implemented in a multicast environment such that CSI reporting occurs in an implicit manner.

According to the techniques described herein, wireless communications system 200, while operating in a multicast mode, may support adaptive retransmissions by implementing SRS transmissions, channel feedback reporting, and/or HARQ operation for multicast to determine location and/or channel information for UEs 215 that fail to receive an initial multicast transmission. For example, to support adaptive multicast retransmissions, wireless communications system 200 may implement joint HARQ feedback and CSI reporting for multicast by assigning shared HARQ resources to UEs 215 and associating each PUCCH resource with a particular set of CSI.

In some cases, to support indicating a location of UEs 215 that failed to receive multicast transmissions, a set of shared HARQ resources may be grouped into subsets of HARQ resources. In some cases, each subset of HARQ resources may be associated with a group of UEs 215 located within a coverage area. For example, a first subset of the HARQ resources may be associated with group 210-a of UEs 215, a second subset of the uplink communication resources may be associated with group 210-b of UEs 215, and a third subset of the uplink communication resources may be associated with group 210-c of UEs 215. In some cases, the first, second, and third subsets of the HARQ resources include consecutive HARQ resources.

In some examples, after failing to receive or decode a multicast transmission, UE 215-a may transmit a NACK message over a HARQ feedback resource of a subset of the HARQ resources that is associated with group 210-a of UEs 215. After receiving the NACK message over the subset of the HARQ resources, a base station may determine that a UE 215 within group 210-a failed to receive a multicast transmission and may perform a retransmission that is adapted for group 210-a. For example, after receiving the NACK message over the first subset of the HARQ resources, the base station may perform a multicast retransmission using transmission parameters that are adapted for group 210-a— e.g., using a transmission beam that is formed in the direction of group 210-a.

Additionally, or alternatively, to support indicating CSI for UEs 215 that fail to receive multicast transmissions, each resource of a shared set of HARQ resources may be configured to correspond to a particular set of CSI. For example, a first HARQ feedback resource may correspond to a first CRI index, a first set of PMI indices, and a first set of CQI indices. And a second HARQ feedback resource may correspond to a first CRI index, a second set of PMI indices, and the first set of CQI indices. In some cases, sets of CSI are assigned to the shared HARQ resources based on a grouping of UEs 215 within a coverage area. For example, CSI indices that are associated with a first group of UEs (e.g., group 210-a) may be assigned to a first subset of consecutive HARQ resources (e.g., by assigning a first CRI index to the first subset of consecutive HARQ resources), CSI indices that are associated with a second group of UEs (e.g., group 210-b) may be assigned to a first subset of consecutive HARQ resources (e.g., by assigning a second CRI index to the second subset of consecutive HARQ resources), and so on. In some cases, a first CRI index may be associated with a first transmission beam that is directed toward group 210-a; a second CRI index may be associated with a second transmission beam that is directed toward group 210-b; and a third CRI index may be associated with a third transmission beam that is directed toward group 210-c.

In some cases, after failing to receive or decode a multicast transmission, first UE 215-a may transmit a NACK message over a HARQ feedback resource that is associated with group 210-a and reflects CSI feedback determined by first UE 215-a. For example, after determining a preferred transmission beam, a preferred precoding matrix, and a CQI index for a received multicast transmission—e.g., based on a CQI-RS measurement—first UE 215-a may transmit the NACK message over a HARQ feedback resource that is mapped to a first CRI index, a first set of precoding matrices that includes the precoding matrix, and a set of CQI indices that includes the CQI index. After receiving the NACK message over a HARQ resources, a base station may determine that a UE within group 210-a failed to receive a multicast transmission—e.g., based on determining that the HARQ feedback resource is associated with a first transmission beam. In some cases, the base station may also determine CSI associated with group 210-a—e.g., based on determining that the HARQ feedback resource is associated with a first set of precoding matrices and a first set of channel qualities. After determining that a UE within group 210-a failed to receive the multicast transmission and a set of CSI for group 210-a, the base station may perform a retransmission that is adapted for group 210-a based on the determined set of CSI.

In some examples, to support adaptive multicast retransmissions, wireless communications system 200 may implement joint HARQ feedback and CSI reporting for multicast by using shared SRS resources where each SRS resource is associated with a particular set of CSI and received SRS transmissions are interpreted as NACK messages. In such cases, UEs 215 may be configured to transmit an SRS over shared SRS resources only after failing to decode an initial multicast transmission.

For example, UEs 215 may be configured with a shared set of SRS resources. After failing to receive a multicast transmission, first UE 215-a may transmit an SRS over a shared SRS resource that is associated with a set of CSI determined by first UE 215-a. A base station may receive the SRS transmission and determine that a UE from group 210-a failed to receive a multicast transmission as well as CSI for group 210-a based on a set of CSI associated with the shared SRS resource. After determining that a UE in group 210-a failed to receive the multicast transmission, the base station may perform a multicast retransmission using transmission parameters that are tailored to group 210-a.

In some cases, the UEs 215 may determine CSI for a multicast channel based on CSI-RSs that are associated with the multicast channel—e.g., using CSI-RS that are located within the multicast channel and/or quasi-collocated with the multicast channel. In some cases, a base station configures UEs 215 to measure a particular set of CSI-RS resources to determine CSI for a multicast channel. For example, the base station may indicate K CSI-RS resources for UEs 215 to measure. In other cases, each UE 215 may autonomously select K CSI-RS resources to measure. In some examples, the network (e.g., a base station) sends a message to UEs 215 indicating the quantity (K) of CSI-RS resources to measure. In other examples, UE 215 independently determines the quantity (K) of CSI-RS resources to measure and indicates the chosen quantity to the network. In some cases, UEs 215 may use CSI-RS resources used for estimating a unicast channel separately from CSI-RS resources used for estimating a multicast channel.

In some examples, to support adaptive multicast retransmissions, wireless communications system 200 may implement joint CSI reporting and HARQ feedback (or joint CSI reporting and SRS transmissions) for multicast by using shared uplink PRG resources, where each uplink PRG resource is associated with a particular set of CSI. In some cases, UEs 215 may receive a multicast transmission over multiple downlink PRG resources that are each associated with different precoding matrices and/or beamforming. In some cases, the downlink PRG resources may also be associated with respective uplink PRG resources. In some cases, UEs 215 may also receive DMRSs in each of the downlink PRG resources. UEs 215 may use the received DMRSs to perform instantaneous multicast channel estimates for the different downlink PRG resources. If one or more of UEs 215 fail to receive the multicast transmission, the one or more UEs 215 may transmit a NACK message over an uplink PRG resource that corresponds to the downlink PRG resource having the highest SNR. In some cases, a base station that receives a NACK message over an uplink PRG resource may perform a retransmission using a precoding matrix and/or beamforming associated with the PRG resource. Alternatively, one or more UEs 215 may transmit an SRS over an uplink PRG resource that corresponds to the downlink PRG resource having the highest SNR. In some cases, a base station that receives an SRS over an uplink PRG resource may perform a retransmission using a precoding matrix and/or beamforming associated with the PRG resource.

In some examples, UE 215-a receives a multicast transmission that is transmitted over a first downlink PRG resources using a first beamforming and first precoding matrix, a second downlink PRG resources using a second beamforming and second precoding matrix, and a third downlink PRG resources using a third beamforming and third precoding matrix. UE 215-a may also receive a first DMRS in the first downlink PRG resource, a second DMRS in the second downlink PRG resource, and a third DMRS in the third downlink PRG resource. In some examples, UE 215-a may determine instantaneous SNR values for the first, second and third downlink PRG resources based on the first, second, and third DMRSs and determine that signals received over the third downlink PRG resource have the highest SNR.

In some cases, UE 215-a may fail to decode the multicast transmission and transmit a NACK indication (e.g., a NACK message or SRS-based NACK transmission) over a third uplink PRG resource that corresponds to the third downlink PRG resource. A base station may receive the NACK indication over the third uplink PRG resource and perform a multicast retransmission over a subsequent instance of the third downlink PRG resources—e.g., using the precoding matrix and/or beamforming associated with the third downlink PRG resources. Alternatively, UE 215-a may transmit an SRS over the third uplink PRG resource that corresponds to the third downlink PRG resource. A base station may receive the SRS over the third uplink PRG resource and perform a multicast retransmission over a subsequent instance of the third downlink PRG resources—e.g., using the precoding matrix and/or beamforming associated with the third downlink PRG resources.

In some cases, a base station may configure UEs 215 to use one or more of the above techniques for reporting channel state and/or HARQ information. In some cases, the base station may switch between joint CSI and HARQ reporting techniques and joint CSI and SRS reporting techniques—e.g., based on an expected level of multicast traffic and/or available multicast resources. For ease of reference the joint CSI and HARQ reporting techniques may be referred to herein as HARQ-based CSI reporting, or a variation thereof, and the joint CSI and SRS reporting techniques may be referred to herein as SRS-based CSI reporting, or a variation thereof. In general, features and aspects described with respect to one type of CSI reporting (e.g., HARQ-based or SRS-based) may be imputed to the other type of CSI reporting.

Figure 3:
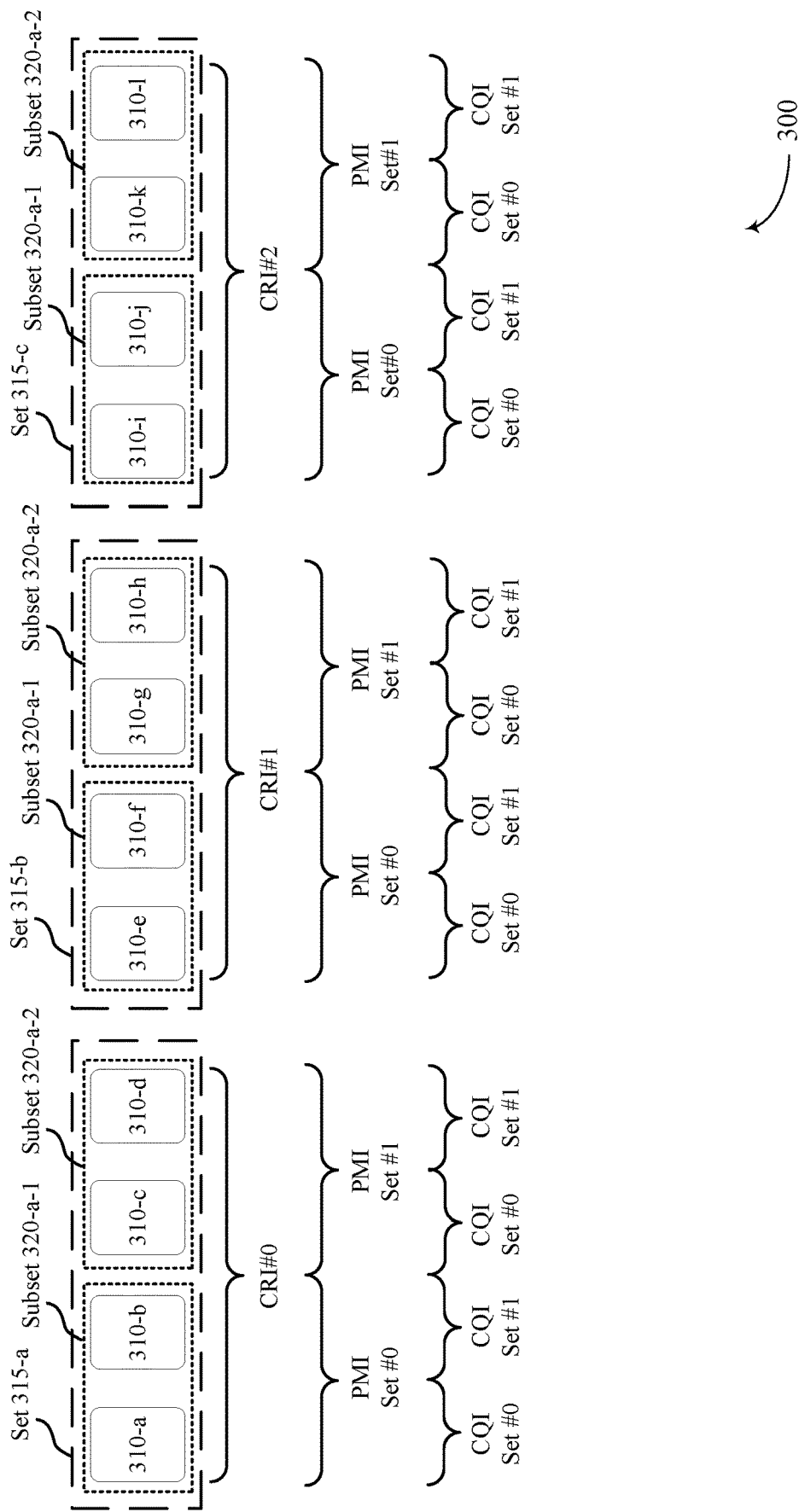
FIG. 3 illustrates an example of an association between reference signal resources and channel state information for reporting multicast feedback based on reference signal transmissions in accordance with aspects of the present disclosure.

FIG. 3 illustrates an example of an association 300 between reference signal resources 310 and channel state information for reporting multicast feedback based on reference signal transmissions in accordance with aspects of the present disclosure. Each reference signal resource 310 may be associated with (e.g., correspond to, map to) a set of channel state information so that transmission of an SRS on a reference signal resource 310 implies a particular set of channel state information. Although described with reference to SRSs, the techniques described herein may be implemented for any type of uplink reference signal.

A base station may configure (e.g., reserve, schedule, allocate, etc.) the reference signal resources 310 for transmission of SRSs by UEs 115 in a multicast environment. For example, the base station may configure reference signal resources 310 for SRSs from UEs 115 that are recipients of a multicast transmission by the base station. In some cases, the reference signal resources 310 may be configured by RRC signaling to occur periodically (e.g., every nth subframe or slot in a period and mth symbol within the subframe or slot). As described below, each reference signal resource 310 may be associated with a set of channel state information. For example, each reference signal resource 310 may be associated with a unique combination of CRI, PMI(s), and CQI(s). As described herein, the CRI may indicate a transmission beam preferred by a UE, the PMI may indicate a precoding matrix preferred by the UE, and the CQI may indicate the channel quality and, indirectly, the MCS preferred by the UE. Although described with reference to CRI, PMI, and CQI, other types of channel state information are contemplated, as are other hierarchical structures for associating reference signal resources with channel state information.

At the highest level, the reference signal resources 310 may be divided into sets that are associated with different CRI. For example, the reference signal resources 310 may include set 315-a, set 315-b, and set 315-c, which may be associated with CRI #0, CRI #1, and CRI #2, respectively. Due to the relationship between CRI and transmission beams, the sets 315 may correspond to different groups of UEs. For instance, the reference signal resources in set 315-a may correspond to a group of UEs by virtue of the UEs sharing a preferred transmission beam as indicated by CRI #0. Referring to FIG. 2 as an illustration, set 315-a may correspond to UEs in group 210-a, set 315-b may correspond to UEs in group 210-b, and set 315-b may correspond to UEs in group 210-c. In some cases, the UEs in a group may be in close proximity with each other as illustrated in FIG. 2. In other cases, the UEs may be dispersed yet still share a preferred transmission beam due to reflections in the multicast environment.

To indicate additional channel state information, the reference signal resources 310 may be further divided into subsets 320 that are associated with different sets of PMI. For example, referring to set 315-a, subset 320-a-1 be associated with PMI set #0 and subset 320-a-2 may be associated with PMI set #1. The PMI sets may be preconfigured at a UE or dynamically configured by RRC signaling. Because there may be many PMIs (e.g., sixteen) supported by a base station, the PMIs may be grouped into sets to reduce the quantity of reference signal resources 310 used to indicate PMI. For example, given a range of PMIs 0 through 15, PMI set #0 may include PMIs 0 through 7 and PMI set #1 may include PMIs 8 through 15.

To indicate more channel state information, each subset 320 of reference signal resources 310 may be further divided into individual reference signal resources that are associated with different sets of CQI. For example, referring to subset 320-a, reference signal resource 310-a may be associated with CQI set #0 and reference signal resource 310-b may be associated with CQI set #1. Because there may be many CQIs supported by a base station, the CQIs may be grouped into sets that are to reduce the quantity of reference signal resources used to indicate CQI. For example, given a range of CQIs 0 through 30, CQI set #0 may include CQIs 0 through 15 and CQI set #1 may include CQIs 16 through 30. In some cases, each reference signal resource 310 may be associated with a relatively high CQI value or a relatively low CQI value (instead of sets of CQI).

Because the associations between reference signal resources 310 and channel state information are known to both a UE and a base station, the UE may implicitly indicate channel state information by transmitting an SRS in the reference signal resource 310 associated with the channel state information. For example, a UE that determines a set of channel state information that includes CRI #1, a precoding matrix index that is included in PMI set #1, and a channel quality index that is included in CQI set #1 may transmit an SRS in reference signal resource 310-h. The UE may select reference signal resource 310-h by determining that set 315-b is associated with CRI #1, determining that subset 320-a-2 is associated with PMI set #1, and determining that reference signal resource 310-h is associated with CQI #1. In some cases, the UE determines the set of channel state information as described in more detail herein and with reference to FIG. 4. In some cases, the UE may refer to a set of rules or a table to determine the reference signal resource 310 that is associated with a given set of channel state information. In some cases, the set of rules or table may be indicated to the UE in a message from the base station. In other cases, the set of rules or table may be preprogrammed at the UE. In some cases, multiple UEs may simultaneously transmit SRSs over a same reference signal resource 310—the SRS transmissions may coherently combine with one another.

Given that the base station also knows the associations between reference signal resources 310 and sets of channel state information, the base station may infer channel state information for a group of UEs based on the SRS(s) being included in reference signal resource 310-h. For example, based on receiving an SRS over reference signal resource 310-h, the base station may determine that one or more multicast-enabled UEs are located in a coverage area region associated with a direction of a transmission beam that indicated by CRI#1. The base station may then select transmission parameters for an upcoming multicast communications based on a set of channel state information that is associated with reference signal resource 310-h. For example, the base station may use a precoding matrix indicated by the set of channel state information (e.g., a precoding matrix indicated by PMI set #1) to transmit multicast data over a particular transmission beam indicated by the channel state information (e.g., a transmission beam indicated by CRI #1). The base station may also use an MCS indicated by the set of channel state information (e.g., an MCS corresponding to a CQI indicated by CQI set #1).

The transmission parameters selected by the base station may be used for an initial transmission of multicast data or a retransmission of multicast data. In some examples, the base station may also select a frequency for the multicast transmission based on measurements of the SRS. Because the multicast transmission is over a particular transmission beam, the group of UEs in the direction of that transmission beam may receive the updated multicast transmission even if only a single UE in the group reports channel state information. So, the techniques for implicit channel state information reporting described herein may be used to adapt multicast transmissions for groups of UEs.

In some cases, a UE may determine that channel state information has changed since the UE last transmitted an SRS. For example, the UE may move to a different region of a coverage area, resulting in new channel conditions and thus new channel state information (e.g., new values for CRI, PMI, and/or CQI). After determining the new channel state information, the UE may indicate the new set of channel state information by transmitting another SRS in a different reference signal resource 310 than was used for the last SRS. For example, if the UE previously transmitted an SRS in reference signal resource 310-h, the UE may transmit another SRS in reference signal resource 310-c to indicate that the channel state information now includes CRI #0, PMI set #1, and CQI set #0. If the channel state information changes again, the UE may indicate the change by transmitting an additional SRS in yet another reference signal resource 310. For example, the UE may transmit an SRS in subset 320-a-2 to indicate that the latest channel state information includes CRI #2, PMI set #1, and CQI set #1.

In some cases, a base station may receive multiple SRSs in a single set 315. Put another way, the base station may receive multiple SRSs on multiple reference signal resources 310 that are each associated with the same CRI. For example, the base station may receive SRSs on reference signal resources 310-a and 310-c. In such cases, the base station may determine that multiple UEs are in a particular location (or at least, prefer a same transmission beam). However, there may be a discrepancy in the precoding matrices preferred by the UEs (e.g., one UE may prefer a precoding matrix included in PMI set #0 and the other UE may prefer a precoding matrix included in PMI set #1). In such a scenario, the base station may select for use the PMI previously used for the indicated CRI (e.g., CRI #0).

In some cases, a base station may receive multiple SRSs in different sets 315. Put another way, the base station may receive multiple SRSs on reference signal resources 310 that are each associated with different CRI. For example, the base station may receive a first SRS on reference signal resource 310-b and a second SRS on reference signal resource 310-f. In such a scenario, the base station may determine that there are UEs in two different areas (or at least, UEs that prefer different transmission beams). Accordingly, the base station may use transmission parameters that are based on channel state information associated with the multiple reference signal resources 310 (e.g., 310-b and 310-f) conveying the SRSs.

In another example of receiving multiple SRSs, the base station may receive SRSs in three different sets 315. For example, the base station may receive SRSs on reference signal resource 310-b, reference signal resource 310-f, and reference signal resource 310-j. In such a scenario, the base station may determine that there are UEs in three different areas (or at least, three UEs that prefer different transmission beams). Because there are too many UEs with varying channel conditions for the channel state information to be meaningfully applied, the base station may ignore the indicated sets of channel state information and use transmission parameters that are selected to reach as many UEs as possible.

As described above and illustrated in FIG. 3, the association between a reference signal resource 310 and a set of channel state information may be one-to-one. That is, each reference signal resource 310 may be associated with a unique set of channel state information. However, in some examples the mapping between reference signal resources 310 and sets of channel state information may be one-to-many or many-to-one. As an example of one-to-many mapping, a single reference signal resource 310 may be associated with two sets of channel state information. As an example of many-to-one mapping, multiple reference signal resources 310 may be associated with the same set of channel information. When a set of channel state information is associated with multiple reference signal resources 310, the UE reporting the channel state information may select one of the associated reference signal resources 310 according to its configuration or to provide one or more advantages.

In some examples, a UE may determine a set of channel state information that is not associated with a reference signal resource 310. For instance, the UE may determine a set of channel state information that includes CRI #0, PMI subset #0, and an intermediate CQI that is not included in either CQI set. In such a scenario, the UE may identify the reference signal resources 310 associated with the channel information closest to the set of channel information determined by the UE and transmit an SRS on one of those reference signal resources 310. Continuing the foregoing example, the UE may identify reference signal resources 310-a and 310-b and transmit an SRS over one of those reference signal resources 310—e.g., based on determining that one of the reference signal resources will cause a base station to transmit a more robust transmission. In some examples, the reference signal resources 310 may be associated with other aspects of a wireless communications system. For example, each reference signal resource 310 may be associated with a PRG, which may be a collection of physical resource blocks (PRBs) that are applied with the same precoding matrix. In such examples, a base station may transmit a DMRS within a multicast PDSCH that spans multiple PRGs applied with different precoding matrices (e.g., the base station may use a different precoding matrix for each PRG). A UE that receives the multicast PDSCH may measure the DMRS to determine the PRG with the highest SINR, then transmit an SRS in the reference signal resource 310 that is associated with the PRG. Upon receiving the SRS in the reference signal resource 310, the base station may determine that the preferred precoding matrix and/or beamforming for communications with the UE is the precoding matrix and/or beamforming that was used for the PRG associated with the reference signal resource 310. Accordingly, the base station may use that precoding matrix for the next multicast transmission to the UE. Because associating reference signal resources 310 with PRGs allows for implicit indication of the preferred precoding matrix and/or transmission beam for a UE, in some examples the association between reference signal resources 310 and PRGs may replace the association between reference signal resources 310 and PMI sets.

As noted, the reference signal resources 310 may be configured by a base station (e.g., via RRC signaling). In a first example, the reference signal resources 310 may be configured to occur periodically (e.g., so that SRS transmission opportunities occur every nth subframe). When the reference signal resources 310 occur periodically, the UE may transmit SRSs periodically, aperiodically, or semi-persistently. For periodic SRS transmissions, the UE may transmit an SRS in every period of reference signal resources 310. Thus, the channel state information may be reported to the base station on a periodic basis. For semi-persistent or aperiodic SRS transmissions, the UE may wait to be activated before transmitting an SRS. Aperiodic reporting may be activated by a downlink control information (DCI) format that schedules a multicast PDSCH and semi-persistent reporting may be triggered by a MAC-CE that is included in a multicast PDSCH. Thus, the channel state information may be reported to the base station on an on-demand basis. In yet other examples, a UE may transmit an SRS independent of the base station and at the discretion of the UE (e.g., when the channel state information changes by a threshold amount).

In a second example, the reference signal resources 310 may be configured to occur each time a multicast PDSCH is scheduled for the UE. In such cases, the UE may implement semi-persistent or aperiodic SRS reporting by transmitting an SRS when a trigger is detected (e.g., when a particular MAC-CE or DCI format is received). Alternatively, the UE may be configured to transmit an SRS if the UE fails to decode the PDSCH data (but not if the UE successfully decodes the PDSCH data). In such an implementation, a base station that receives an SRS may treat receipt of the SRS as a pseudo-NACK. That is, the existence of the SRS may indicate that a UE failed to decode the PDSCH transmission, which may prompt the base station to take one or more corrective actions, such as re-transmitting the multicast data. Such an implementation may conserve UE resources by allowing the UE to skip SRS transmission when the channel state information used by the base station is accurate enough to allow the UE to successfully decode multicast transmissions.

In an additional or alternative example, shared HARQ resources may be similarly configured to be associated with channel state information. In such cases, a UE may similarly transmit a negative acknowledgment message over a particular shared HARQ resource based on a set of channel state information determined by the UE. And a base station may similarly determine and use information about a multicast channel based on receiving one or more negative acknowledgment messages over the shared HARQ resources to adapt subsequent multicast retransmissions. In some cases, a base station may configure a UE or set of UEs to use one or both of the above techniques for joint HARQ feedback and CSI reporting (e.g., the base station may configure the UE or set of UEs to use HARQ-based CSI reporting and/or SRS-based CSI reporting). In some examples, the base station may switch between the different CSI reporting techniques—e.g., based on measured multicast channel conditions.

Figure 4:
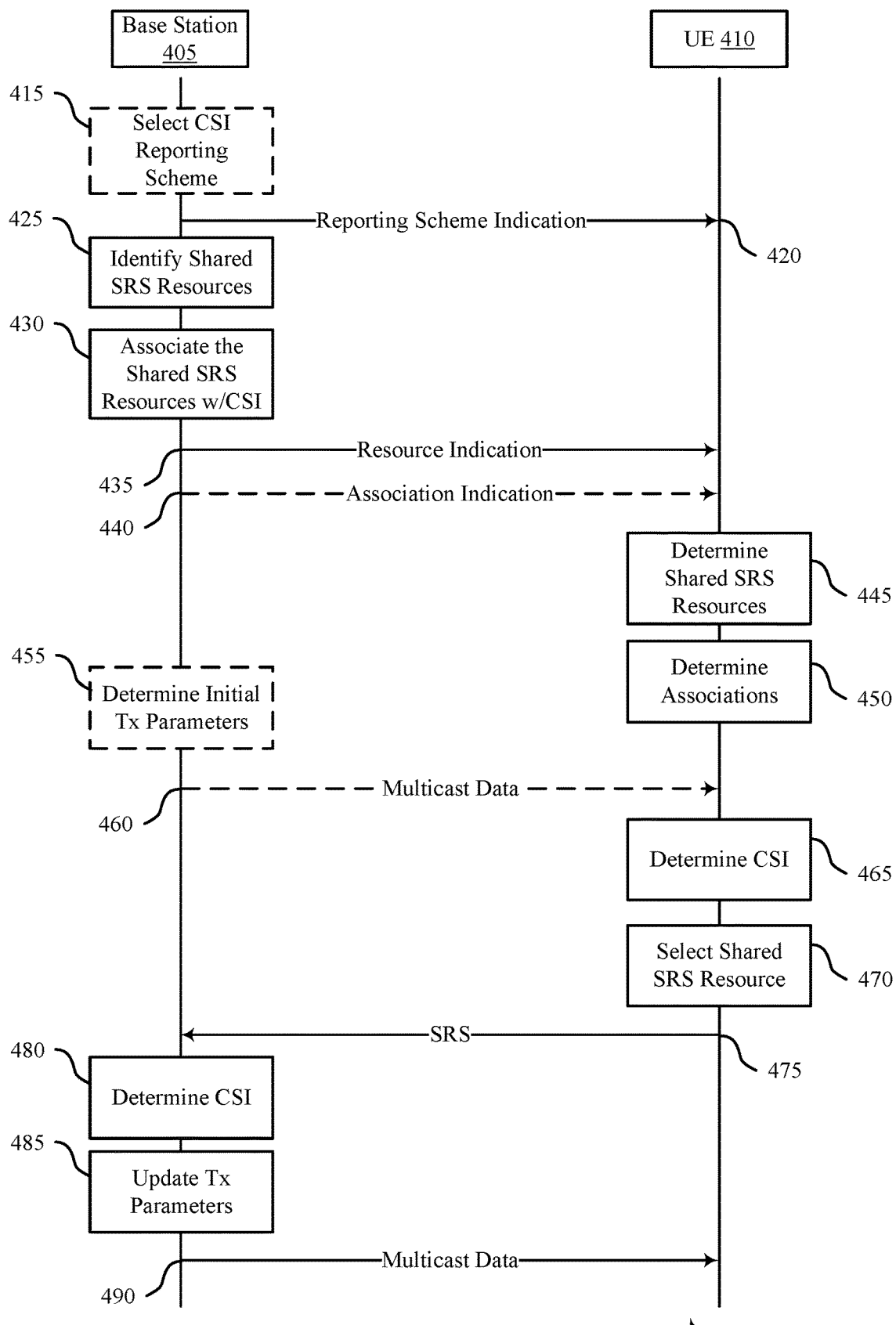
FIGS. 4 and 5 illustrate example process flows for reporting multicast feedback based on reference signal transmissions in accordance with aspects of the present disclosure.

FIG. 4 illustrates an example of a process flow 400 for reporting multicast feedback based on reference signal transmissions in accordance with aspects of the present disclosure.

Process flow 400 may be performed by base station 405 which may be an example of a base station described herein, including with reference to FIGS. 1, 2 and 4. Process flow 400 may also be performed by UE 410, which may be an example of a UE described herein, including with reference to FIGS. 1 and 2. In some examples, base station 405 and UE 410 are part of a multicast or mixed mode wireless communications system. In some examples, process flow 400 illustrates a technique for implicitly indicating a set of channel state information in a multicast environment using shared reference signal resources.

In the following description of the process flow 400, the operations between base station 405 and UE 410 may occur in a different order than the exemplary order shown, or the operations performed by the devices may be performed in different orders or at different times. Certain operations may also be left out of the process flow 400, or other operations may be added to the process flow 400.

At block 415, base station 405 may select a channel state information reporting scheme for multicast UEs. For example, base station 405 may select a HARQ-based CSI reporting scheme in which HARQ resources carrying NACKs are associated with sets of channel state information. Alternatively, base station 405 may select an SRS-based CSI reporting scheme in which reference signal resources carrying SRSs are associated with sets of channel state information. In some examples, base station 405 may select an SRS-based CSI reporting scheme that uses SRSs to indicate a multicast transmission failure (e.g., that uses an SRS as a pseudo-NACK message, which may also be referred to as an SRS-NACK).

In the example illustrated in process flow 400, base station 405 may select an SRS-based CSI reporting scheme. After selecting the CSI reporting scheme, base station 405 may, at arrow 420, transmit an indication of the reporting scheme to UE 410. In some examples, the indication is included in an RRC message that is part of multicast transmission. In other examples, the indication is included in downlink control information that is part of a multicast transmission.

At block 425, base station 405 may identify SRS resources to be shared by UEs that receive multicast communications. A set of resources is shared by UEs if multiple UEs are permitted to transmit over the resources. The shared SRS resources may be allocated for SRS transmissions and may include time and frequency resources like the reference signal resources 310 described with reference to FIG. 3.

At block 430, base station 405 may determine the associations between the shared SRS resources and sets of channel state information. In some examples, base station 405 may reference one or more sets of rules or tables to determine the associations. The sets of rules or tables may be preconfigured (e.g., hardcoded) at base station 405 or configured at base station 405 by the network. Alternatively, base station 405 may autonomously determine the associations. The association between the SRS resources and sets of channel state information may be one-to-one, as illustrated in FIG. 3, one-to-many, or many-to-one.

At arrow 435, base station 405 may transmit, and UE 410 may receive, an indication of the shared SRS resources. The indication may be included in an RRC message or DCI message that is part of a multicast communication. In some cases, the indication of the SRS resources may indicate to UE 410 a periodicity of the SRS resources. In other examples, the indication may indicate to UE 410 that the SRS resources occur every time a multicast PDSCH transmission occurs.

At arrow 440, base station 405 may transmit, and UE 410 may receive, an indication of the associations between the shared SRS resources and sets of channel state information. In some examples, the indication of associations may be included in an RRC message or DCI message that is part of a multicast communication. In some examples, the indication of associations may be included in the message that conveys the reporting scheme indication. In some cases, the indication may convey the table or set of rules used by base station 405 to determine the associations or the indication may indicate a table or set of rules already configured at UE 410, among other alternatives. In some cases, the indication may include an index that is associated with a particular association between SRS resources and sets of channel state information. In some cases, the indication may indicate the CRI values that are assigned to the different sets of SRS resources.

At block 445, UE 410 may determine the shared SRS resources that it is to use for multicast operations. UE 410 may determine the shared SRS resources based on information from base station 405 (e.g., based on the resource indication at 435 and/or the reporting scheme indication at 420). In some examples, UE 410 may determine that the shared SRS resources are configured to occur periodically. In other examples, UE 410 may determine that the SRS resources are configured to occur when multicast PDSCH transmissions occur. In some cases, UE 410 may determine that the shared SRS resources include multiple sets of shared SRS resources for each PRG used for a downlink multicast transmission.

At block 450, UE 410 may determine the associations between the shared SRS resources and sets of channel state information. UE 410 may determine the associations based on information received from base station 405 (e.g., based on the association indication at 440 and/or the reporting scheme indication as 420). In some examples, the associations determined by UE 410 may be consolidated into a table or set of rules that UE 410 can later reference. In other examples, UE 410 may determine the associations by identifying a table or set of rules configured at UE 410 that represents the associations.

At block 455, base station 405 may determine a set of transmission parameters for an initial multicast transmission. For example, base station 405 may determine a transmission beam, precoding matrix, MCS, and/or frequency for the initial multicast transmission. In some cases, the set of transmission parameters may be selected to reach as many UEs as possible. At arrow 460, base station 405 may transmit multicast data (e.g., in a multicast PDSCH) using the transmission parameters determined at block 455. In some cases, the multicast data transmission may be an initial transmission for a HARQ process. Accordingly, UE 410 may receive the multicast PDSCH at arrow 460 and attempt to decode the multicast data.

At block 465, UE 410 may determine channel state information for a multicast channel between UE 410 and base station 405. The channel state information may be determined by measuring the multicast channel, which may involve one or more measurements of reference signals transmitted over the multicast channel. In some cases, the channel state information may also be based on the transmission of multicast data at arrow 460.

In a first example, UE 410 may determine the channel state information based on measurements of CSI-reference signals transmitted by base station 405. The CSI-reference signals may be transmitted over different beams and, from the perspective of UE 410, may be separate from CSI-reference signals transmitted for unicast. In one example, UE 410 may measure K CSI-reference signals to determine the CRI, PMI, and/or CQI for the multicast channel. The quantity of measured CSI-reference signals may be less than the quantity of CSI-reference signals transmitted by base station 405.

In some cases, base station 405 may determine the quantity K and indicate the quantity to UE 410 (e.g., via RRC signaling, MAC signaling, or physical layer signaling). In such cases, base station 405 may also indicate the CSI-reference signals that UE 410 is expected to measure. In some cases, UE 410 may autonomously determine the quantity K and indicate the quantity to base station 405. Because UE 410 can measure a limited number of CSI-reference signals, UE 410 may indicate the quantity K so that base station 405 knows how many CSI-reference signal computational processes are occupied with the multicast measurements. This way, base station 405 can determine how many CSI-reference signals UE 410 is able to measure for unicast and operate accordingly.

In a second example, UE 410 may determine the channel state information based on measurements of DMRSs transmitted by base station 405. The base station 405 may transmit the DMRSs in a PDSCH that spans multiples PRGs, each of which is applied with a different precoding matrix. Upon receipt of the PDSCH, UE 410 may measure the DMRSs to determine the SINR for each PRG. UE 410 may then determine the PRG with the highest SINR. The PRG with the highest SINR may serve as a basis for selecting an SRS resource at 470. For example, UE 410 may select, for transmission of an SRS, the SRS resource associated with the PRG with the highest SINR. In such a scenario, base station 405 may determine the precoding matrix to use for a subsequent multicast transmission based on the SRS resource used to convey the SRS. For example, base station 405 may determine that the SRS resource is associated with a particular PRG and select the precoding matrix used for that PRG as the precoding matrix for the subsequent multicast transmission.

At block 470, UE 410 may select a shared SRS resource for transmission of a sounding reference signal. UE 410 may select the SRS resource based on the channel state information determined at block 465 and based on the associations determined at block 450. For example, UE 410 may select the SRS resource based on the SRS resource being mapped to channel state information that matches (or includes) the channel state information determined by UE 410 at block 465. As an example, if at block 465 UE 410 determines that the channel state information for the multicast channel includes CRI #x, PMI #y, and CQI #z, at block 470, UE 410 may select the SRS resource that maps to CRI #x, PMI #y (or PRG #y), and CQI #z.

At arrow 475, UE 410 may transmit an SRS in the shared SRS resource selected at block 470. In some examples, UE 410 may transmit the SRS as part of a periodic SRS transmission scheme. For instance, UE 410 may transmit the SRS in the next instance of periodic SRS resources that occurs after determining the channel state information. Or UE 410 may transmit the SRS in response to determining that UE 410 failed to decode multicast data (e.g., the multicast data transmitted at arrow 460). Alternatively, UE 410 may transmit the SRS in response to a trigger received from base station 405. In one example, the trigger may be a control element (e.g., a MAC-CE) that is included in a multicast PDSCH transmission (e.g., the multicast PDSCH transmission at arrow 460). In another example, the trigger may be a DCI format that schedules a multicast PDSCH transmission. In some cases, UE 410 may transmit the SRS in response to determining that channel state information has changed by a threshold amount.

At block 480, base station 405 may determine channel state information for UE 410 or a group of UEs that includes UE 410 based on the sounding reference signal received at arrow 475. For example, base station 405 may identify the sounding reference signal resource used to convey the SRS and refer to the associations determined at block 430 to determine the channel state information that maps to the sounding reference signal resource. Thus, base station 405 may determine that the channel state information for UE 410 or a group of UEs that includes UE 410 includes CRI #x, PMI #y (or PRG #y), and CQI #z.

At block 485, base station 405 may update the transmission parameters for multicast communications. For example, base station 405 may select a transmission beam that corresponds to CRI #x, a precoding matrix that corresponds to PMI #y (or PRG #y), and an MCS that corresponds to CQI #z. At 490, base station 405 may transmit multicast data using the transmission parameters selected at block 485. In some examples, the multicast data may be the same as the multicast data transmitted at arrow 460. Thus, the transmission at arrow 490 may be an adaptive retransmission. In other examples, the multicast data may be new multicast data, meaning that the transmission at arrow 490 is an adaptive transmission.

Figure 5:
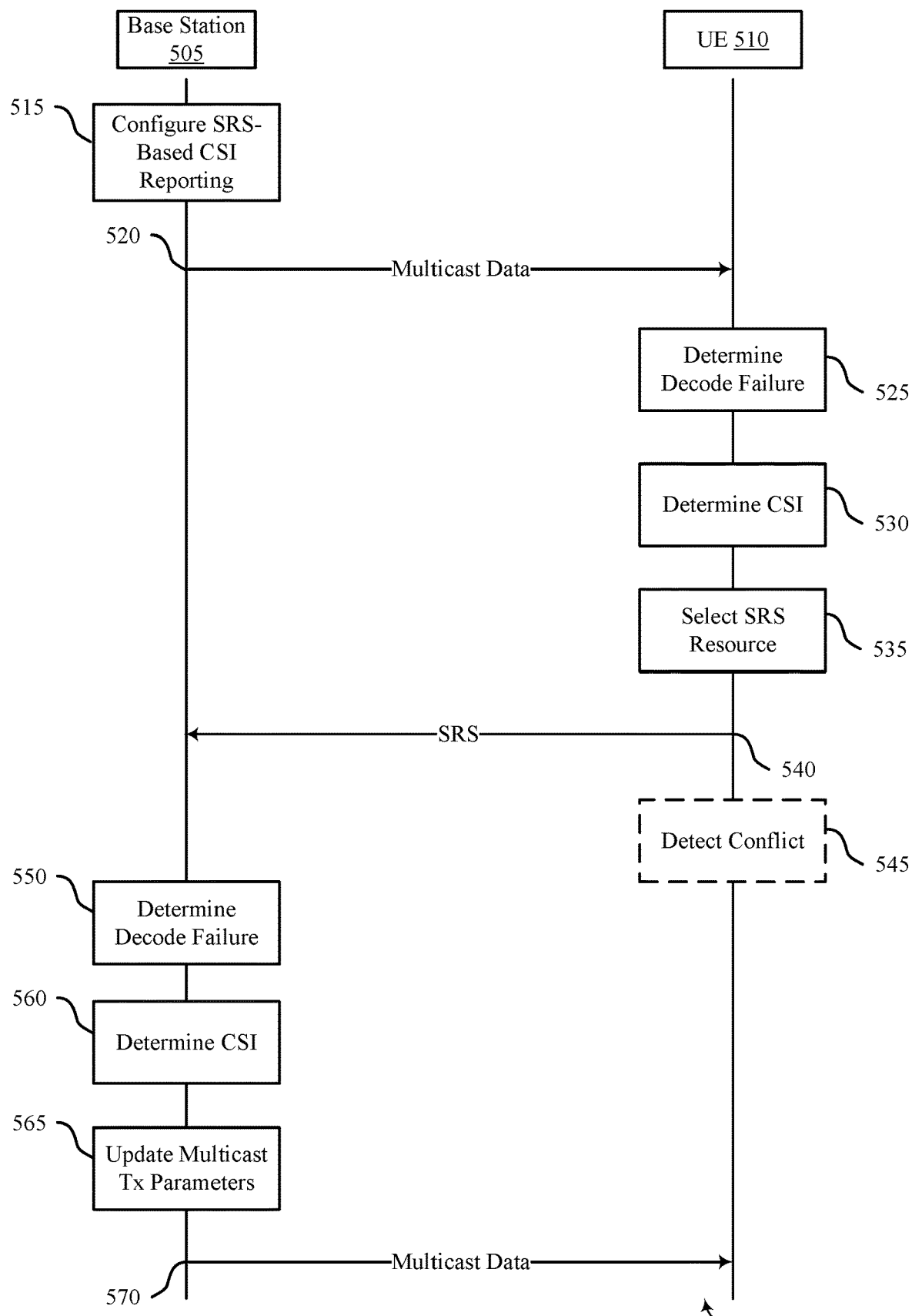

FIG. 5 illustrates an example of a process flow 500 for reporting multicast feedback based on reference signal transmissions in accordance with aspects of the present disclosure. Process flow 500 may be performed by base station 505 which may be an example of a base station described herein, including with reference to FIGS. 1, 2 and 4. Process flow 500 may also be performed by UE 510, which may be an example of a UE described herein, including with reference to FIGS. 1, 2 and 4. In some examples, base station 505 and UE 510 are part of a multicast or mixed mode wireless communications system. In some examples, process flow 500 illustrates a technique for implicitly indicating a reception status information and channel state information in a multicast environment.

In the following description of the process flow 500, the operations between base station 505 and UE 510 may occur in a different order than the exemplary order shown, or the operations performed by the devices may be performed in different orders or at different times. Certain operations may also be left out of the process flow 500, or other operations may be added to the process flow 500.

At block 515, base station 505 may configure UE 510 to implement SRS-based CSI reporting. For example, base station 505 may perform the operations between blocks 415 and 455, inclusively, as described with reference to FIG. 4. In some cases, configuring UE 510 may include configuring the UE 510 to transmit SRS when UE 510 fails to decode a multicast data transmission. By selectively transmitting an SRS when decoding is unsuccessful, UE 510 may conserve resources that would otherwise be consumed transmitting an SRS to update channel state information (even though the current transmission parameters used by base station 505 are adequate for communication).

At arrow 520, base station 505 may transmit multicast data to UE 510 in a multicast data channel (e.g., a multicast PDSCH). Upon receipt of the multicast data channel, UE 510 may attempt to decode the multicast data. At block 525, UE 510 may determine that it has failed to successfully decode the multicast data. At block 530, UE 510 may determine channel state information for the multicast channel as described herein. For example, UE 510 may determine the CSI based on CSI-RS included in the received multicast transmissions/or prior multicast transmissions. At block 535, UE 510 may select a shared SRS resource for transmitting an SRS. UE 510 may select the shared SRS based on the channel state information determined at block 530. For example, UE 510 may select the SRS resource based on the SRS resource being associated with set of channel state information the same as, or similar to, the channel state information determined by UE 510.

At arrow 540, UE 510 may transmit an SRS over the SRS resource selected at block 535. Thus, UE 510 may transmit the SRS over an SRS resource that is associated with the set of channel state information determined by UE 510. In some examples, UE 510 may, at block 545, detect a conflict between transmitting the SRS over the SRS resource and transmitting control information in an uplink control channel (e.g., PUCCH) or data in an uplink data channel (e.g., PUSCH). For example, UE 510 may determine that the selected SRS resource coincides with the uplink control channel or uplink data channel. Because the SRS is serving as feedback information (e.g., a pseudo-NACK) for a downlink multicast transmission, UE 510 may resolve the conflict by prioritizing the SRS over the uplink control channel and/or uplink data channel. For example, UE 510 may drop transmission of the uplink control channel and/or the uplink data channel and transmit the SRS. In some examples, UE 510 may puncture an uplink control or data transmission with the SRS transmission and rate match around the SRS transmission.

At block 550, base station 505 may determine that the UE failed to successfully decode the multicast data transmitted at arrow 520. Base station 505 may determine the decoding failure based on receipt of the SRS transmitted at arrow 540. At 560, base station 505 may determine channel state information for UE 510 or a group of UEs that includes UE 510 based on the SRS resource used to convey the SRS. That is, base station 505 may identify a set of channel state information that is mapped to the SRS resource used to convey the SRS. At block 565, base station 505 may update the transmission parameters for a subsequent multicast transmission to UE 510 or the group of UEs that includes UE 510 based the channel state information determined at block 560. For example, base station 505 may update the transmission beam, precoding matrix, MCS, and or frequency used for multicast transmissions. At arrow 570, base station 505 may transmit multicast data to UE 510 using the updated transmission parameters. Thus, the transmission at arrow 570 may be an adaptive retransmission that is based on reception status information and channel state information implicitly indicated by the SRS.

Figure 6:
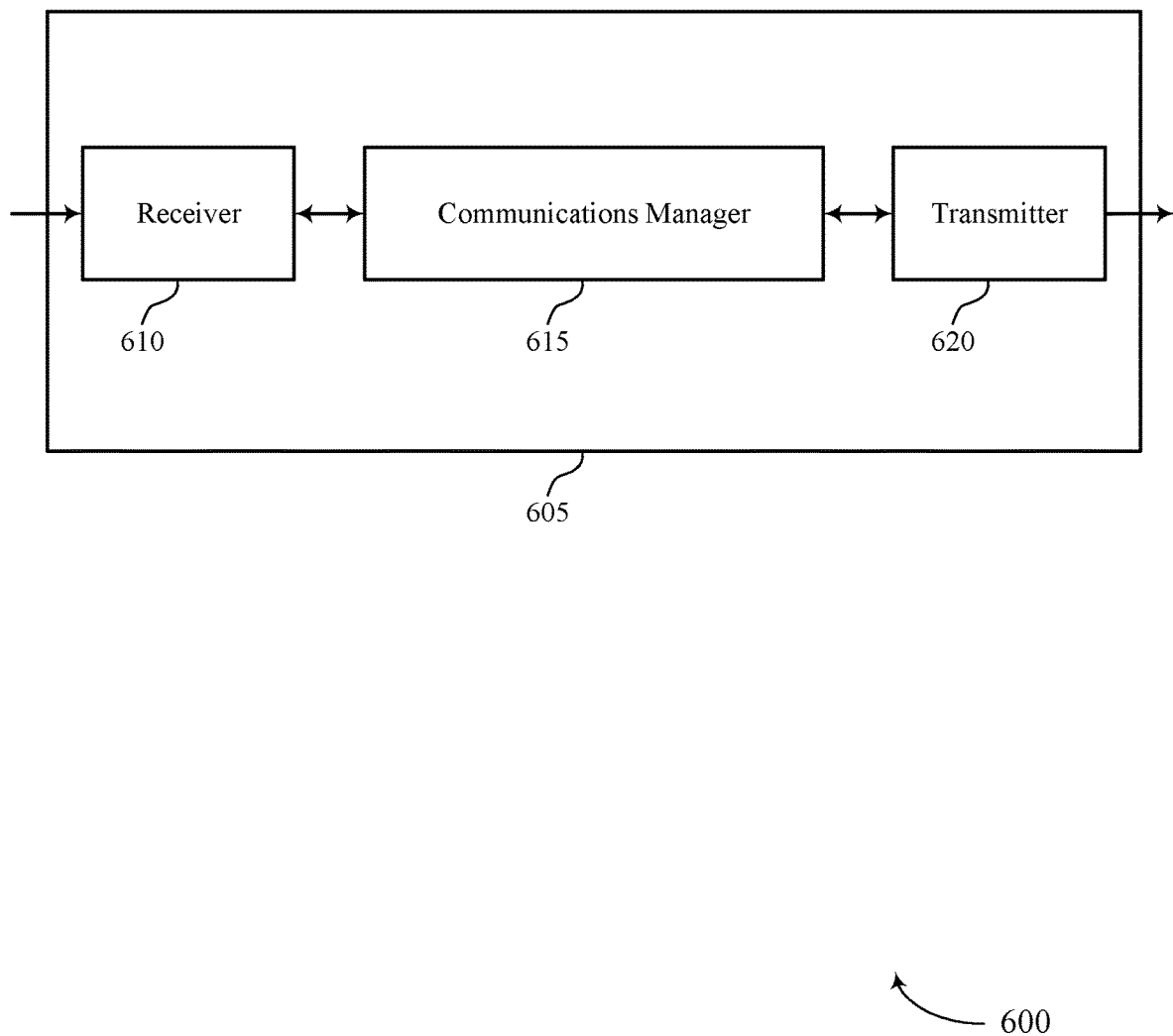
FIG. 6 shows a block diagram of a device that supports reporting multicast feedback based on reference signal transmissions in accordance with aspects of the present disclosure.

FIG. 6 shows a block diagram 600 of a device 605 that supports reporting multicast feedback based on reference signal transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multicast feedback based on reference signal transmissions, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may receive an indication of uplink reference signal resources for transmission by the UE of sounding reference signals, the uplink reference signal resources for UEs associated with multicast communications, measure one or more multicast channels monitored by the UE to determine a set of channel state information for UE receipt of the multicast communications. The communications manager 615 may also select one of the uplink reference signal resources based on an association between the set of channel state information and the one of the uplink reference signal resources. The communications manager 615 may also transmit a sounding reference signal over the one of the uplink reference signal resources. The communications manager 615 may be an example of aspects of the communications manager 810 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 820 described with reference to FIG. 8. The transmitter 620 may utilize a single antenna or a set of antennas.

Figure 7:
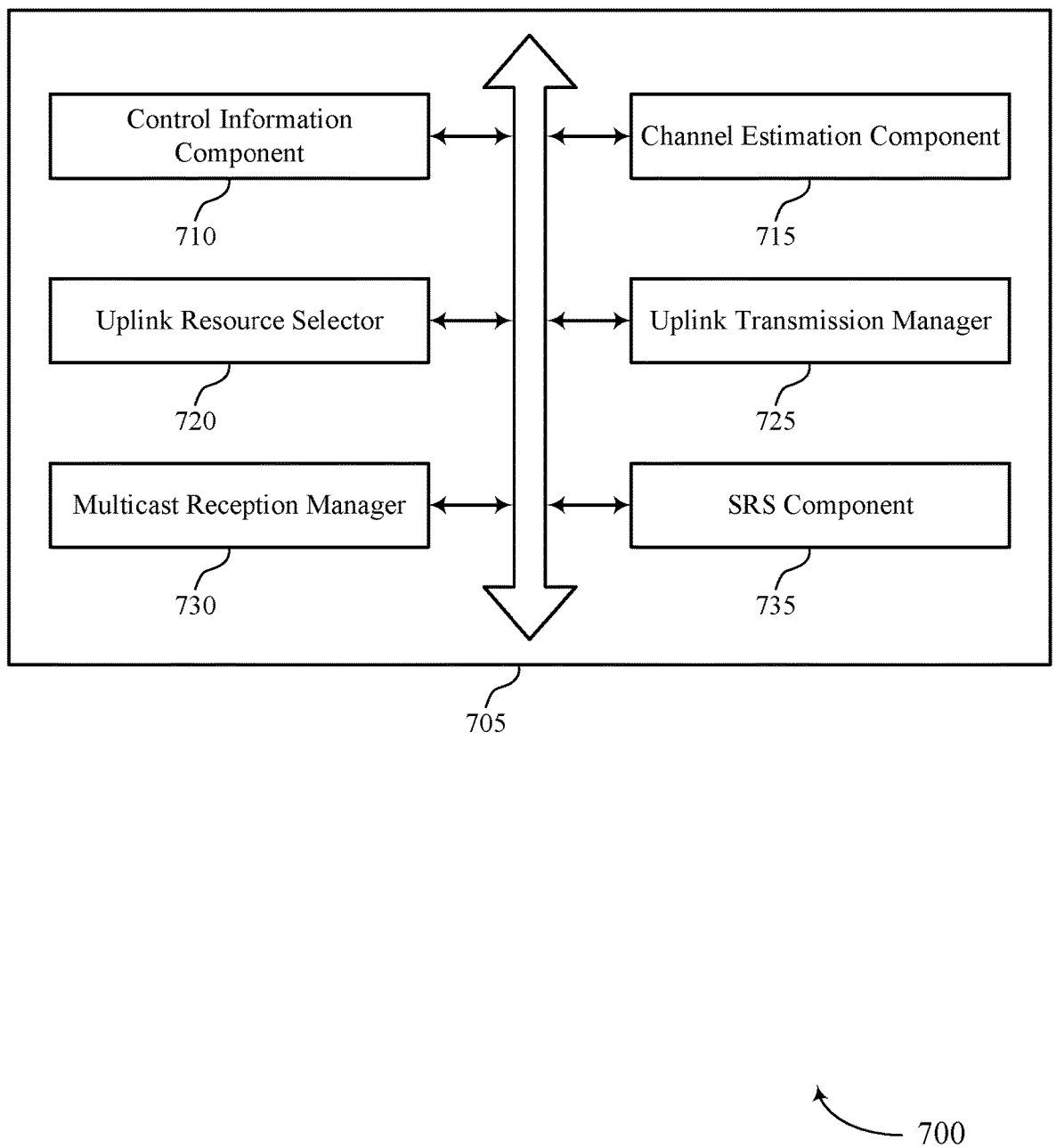
FIG. 7 shows a block diagram of a communications manager that supports reporting multicast feedback based on reference signal transmissions in accordance with aspects of the present disclosure.

FIG. 7 shows a block diagram 700 of a communications manager 705 that supports reporting multicast feedback based on reference signal transmissions in accordance with aspects of the present disclosure. The communications manager 705 may be an example of aspects of a communications manager 615 or a communications manager 810 described herein. The communications manager 705 may include control information component 710, channel estimation component 715, uplink resource selector 720, uplink transmission manager 725, multicast reception manager 730, and SRS component 735. Each of these modules may communicate, directly or indirectly, with one another (e.g., via one or more buses).

Control information component 710 may receive an indication of uplink reference signal resources for transmission by the UE of sounding reference signals, the uplink reference signal resources for UEs associated with multicast communications.

Channel estimation component 715 may measure one or more multicast channels monitored by the UE to determine a set of channel state information for UE receipt of the multicast communications.

Uplink resource selector 720 may select one of the uplink reference signal resources based on an association between the set of channel state information and the one of the uplink reference signal resources.

Uplink transmission manager 725 may transmit a sounding reference signal over the one of the uplink reference signal resources.

In some cases, channel estimation component 715 may measure one or more CSI-reference signals transmitted over the one or more multicast channels and determine the set of channel state information based on the one or more CSI-RSs. In some cases, channel estimation component 715 may receive, from a base station, an indication of one or more CSI-RSs to measure. In some cases, channel estimation component 715 may determine a quantity of CSI-RSs to measure and select the one or more CSI-RSs based on the determining, where the one or more CSI-RSs include the quantity of CSI-RSs. In some cases, channel estimation component 715 may receive, from a base station, an indication of the quantity of CSI-RSs for the UE to measure. In other cases, channel estimation component 715 may transmit, to the base station, the indication of the quantity of CSI-RSs measured by the UE.

In some cases, channel estimation component 715 may measure a plurality of DMRSs transmitted over the one or more multicast channels and determine the set of channel state information based on the plurality of DMRSs. In some cases, the plurality of DMRSs are associated with a plurality of precoding resource block groups. In some cases, channel estimation component 715 may determine that a DMRS of the plurality of DMRSs has a highest signal-to-noise ratio based on the measuring. In some cases, the DMRS with the highest signal-to-noise ration may be associated with a precoding resource block group.

In some cases, channel estimation component 715 may determine, for the set of channel state information, a precoding matrix indicator, channel quality indicator, or channel state information-reference signal resource indicator, or any combination thereof, based on measuring the one or more multicast channels.

In some cases, uplink resource selector 720 may determine associations between each of the uplink reference signal resources and sets of channel state information, where the one of the uplink reference signal resources may be selected based on the associations. In some cases, control information component 710 may receive an indication of the associations in a radio resource control message or a physical downlink control channel message. In some cases, uplink resource selector 720 may determine that a first set of the uplink reference signal resources is associated with a first CSI-RS index and a second set of the uplink reference signal resources is associated with a second CSI-RS index. Uplink resource selector 720 may also determine that a first subset of the first set of the uplink reference signal resources is associated with a first set of precoding matrix indices and a second subset of the first set of the uplink reference signal resources is associated with a second set of precoding matrix indices. Uplink resource selector 720 may additionally determine a first uplink reference signal resource of the first subset of the first set of the uplink reference signal resources is associated with a first set of channel quality indices and a second uplink reference signal resource of the first subset of the first set of the uplink reference signal resources is associated with a second set of channel quality indices. In some cases, the first set of the uplink reference signal resources corresponds to a first group of UEs based on the first CSI-RS index indicating a first transmission beam, and the second set of the uplink reference signal resources corresponds to a second group of UEs based on the second CSI-RS index indicating a second transmission beam.

In some cases, uplink resource selector 720 may identify the one of the reference signal resources based on the set of channel state information determined by the UE. In some cases, uplink resource selector 720 may identify a set of the uplink reference signal resources that is associated with the precoding resource block group based on the determining, wherein the one of the uplink reference signal resources is selected from the set of the uplink reference signal resources. In some cases, uplink resource selector 720 may identify a set of reference signal resources that is associated with one or more CSI-RS indices, where the one of the reference signal resources may be selected from the set of reference signal resources. In some cases, uplink resource selector 720 may identify a set of reference signal resources that is associated with one or more precoding matrix indices, where the one of the reference signal resources is selected from the set of reference signal resources. In some cases, uplink resource selector 720 may identify a set of reference signal resources that is associated with one or more channel quality indices, where the one of the reference signal resources is selected from the set of reference signal resources.

In some cases, channel estimation component 715 may determine that the set of channel state information includes a CSI-reference signal index, a precoding matrix index, and a channel quality index. And uplink resource selector 720 may identify the one of the uplink reference signal resources as being associated with the CSI-RS index, the precoding matrix index, and the channel quality index.

In some cases, channel estimation component 715 may determine that the set of channel state information includes a CSI-reference signal index, and uplink resource selector 720 may identify a set of the uplink reference signal resources that is associated with the CSI-RS index. Uplink resource selector 720 may select the one of the uplink reference signal resources from the set of the uplink reference signal resources. In some cases, channel estimation component 715 may determine that the set of channel state information includes a precoding matrix index, and uplink resource selector 720 may identify, from the set of the uplink reference signal resources, a subset of the uplink reference signal resources that is associated with a first set of precoding matrix indices including the precoding matrix index. Uplink resource selector 720 may select the one of the uplink reference signal resources from the subset of the uplink reference signal resources.

In some cases, channel estimation component 715 may determine that the set of channel state information includes a channel quality index, and uplink resource selector 720 may identify, from the subset of the uplink reference signal resources, a first uplink reference signal resource that is associated with a first set of channel quality indices including the channel quality index. Uplink resource selector 720 may select the first uplink reference signal resource as the one of the uplink reference signal resources. In other cases, uplink resource selector 720 may identify, from the subset of the uplink reference signal resources, a second uplink reference signal resource that is associated with a second set of channel quality indices including the channel quality index, and the first uplink reference signal resource or the second uplink reference signal resource is selected may be the one of the uplink reference signal resources.

In some cases, the one of the uplink reference signal resources is selected based on the UE being associated with a first group of UEs. After selecting the one of the uplink reference signal resources, channel estimation component 715 may determine that a condition of the one or more multicast channels has changed by a threshold amount. Channel estimation component 715 may also determine that the UE is associated with a second group of UEs based on the condition changing by the threshold amount. In some cases, uplink resource selector 720 may select a different uplink reference signal resource of the uplink reference signal resources based on the UE being associated with the second group of UEs.

Multicast reception manager 730 may receive a first multicast transmission using a first set of transmission parameters. In some cases, uplink transmission manager 725 may transmit the sounding reference signal to indicate that the first multicast transmission has been unsuccessfully decoded. In some cases, multicast reception manager 730 may receive, based on transmitting the sounding reference signal, a second multicast transmission that is transmitted based on the association between the set of channel state information and the one of the uplink reference signal resources. In some cases, multicast reception manager 730 may receive the second multicast transmission over a transmission beam indicated by the association between the set of channel state information and the one of the uplink reference signal resources. In some cases, multicast reception manager 730 may receive the second multicast transmission using a modulation and coding scheme indicated by the association between the set of channel state information and the one of the uplink reference signal resources. In some cases, the second multicast transmission includes a retransmission of data included in the first multicast transmission.

In some cases, control information component 710 may receive a radio resource control message including the indication of the uplink reference signal resources. In some cases, SRS component 735 may determine, based on the radio resource control message, that the uplink reference signal resources occur periodically, and that the sounding reference signal is transmitted in one instance of the periodic reference signal resources. In some cases, control information component 710 may receive a control element in a multicast data channel, where transmitting the sounding reference signal may be based on receiving the control element. In some cases, control information component 710 may receive a downlink control information format that schedules a multicast data channel, where transmitting the sounding reference signal may be based on receiving the downlink control information format.

In some cases, multicast reception manager 730 may receive a multicast data channel over the one or more multicast channels, and uplink transmission manager 725 may transmit the sounding reference signal based on failing to decode multicast data conveyed in the multicast data channel. In some cases, when the sounding reference signal is transmitted after failing to decode multicast data, SRS component 735 may determine that transmitting the sounding reference signal over the one of the uplink reference signal resources conflicts with transmitting an uplink control channel or uplink data channel. In some cases, SRS component 735 may prioritize the sounding reference signal over the uplink control channel or uplink data channel by transmitting the reference signal and dropping the transmission of the uplink control channel or uplink data channel. In some cases, multicast reception manager 730 may receive a retransmission of the multicast data based on transmitting the sounding reference signal.

Figure 8:
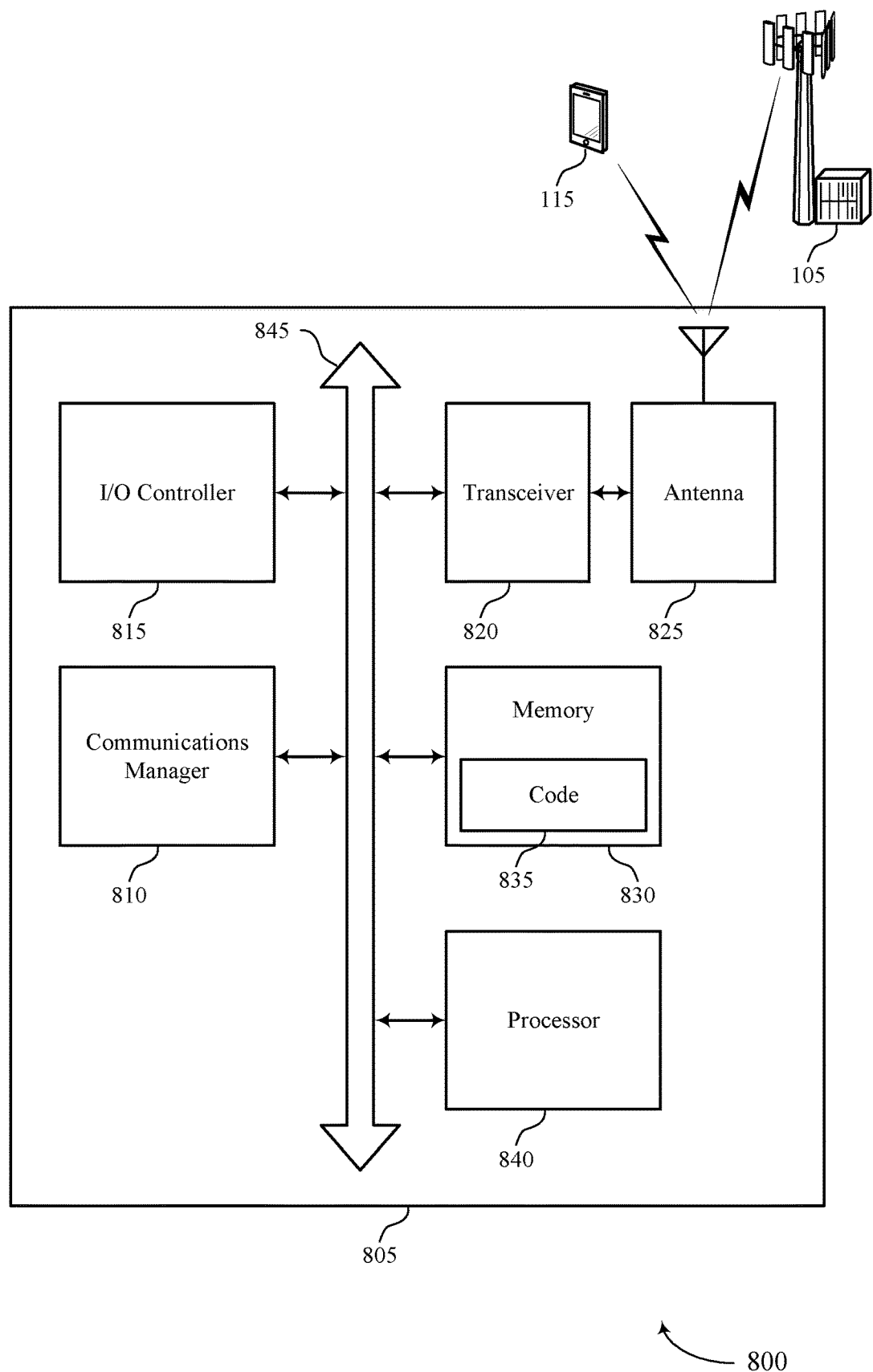
FIG. 8 shows a diagram of a system including a device that supports reporting multicast feedback based on reference signal transmissions in accordance with aspects of the present disclosure.

FIG. 8 shows a diagram of a system 800 including a device 805 that supports reporting multicast feedback based on reference signal transmissions in accordance with aspects of the present disclosure. The device 805 may be an example of or include the components of device 605 or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an indication of uplink reference signal resources for transmission by the UE of sounding reference signals, the uplink reference signal resources for UEs associated with multicast communications, measure one or more multicast channels monitored by the UE to determine a set of channel state information for UE receipt of the multicast communications, select one of the uplink reference signal resources based on an association between the set of channel state information and the one of the uplink reference signal resources, and transmit a sounding reference signal over the one of the uplink reference signal resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multicast feedback based on reference signal transmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
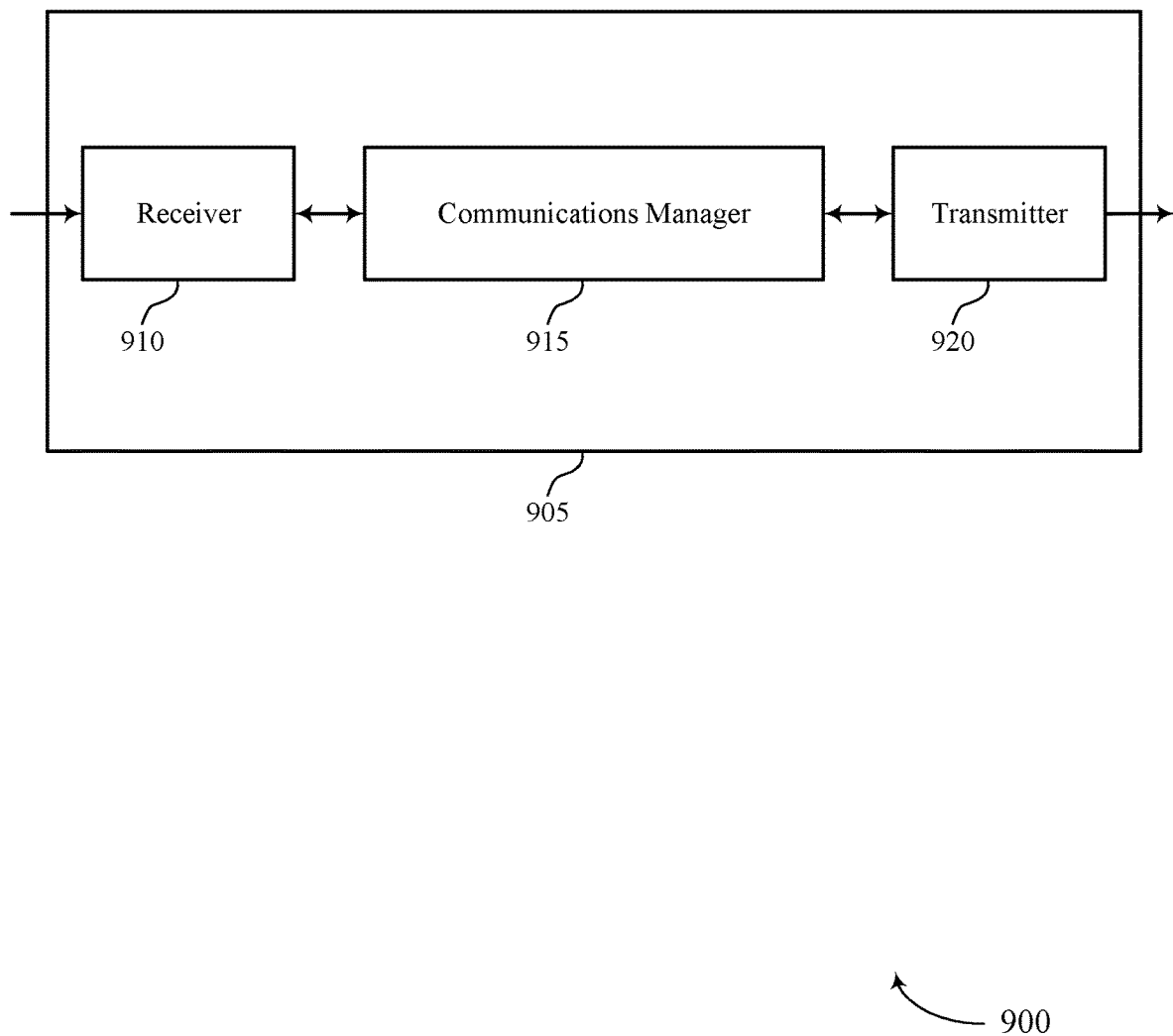
FIG. 9 shows a block diagram of a device that supports reporting multicast feedback based on reference signal transmissions in accordance with aspects of the present disclosure.

FIG. 9 shows a block diagram 900 of a device 905 that supports reporting multicast feedback based on reference signal transmissions in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multicast feedback based on reference signal transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may transmit, over a multicast channel, an indication of uplink reference signal resources for transmission of sounding reference signals, the uplink reference signal resources to be shared by a set of UEs associated with multicast communication. The communications manager 915 may also receive, from a UE, a sounding reference signal over one of the uplink reference signal resources, the one of the uplink reference signal resources associated with a set of channel state information for the UE. The communications manager 915 may also transmit, over the multicast channel, multicast data based on the set of channel state information for the UE. The communications manager 915 may be an example of aspects of the communications manager 1110 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1120 described with reference to FIG. 11. The transmitter 920 may utilize a single antenna or a set of antennas.

Figure 10:
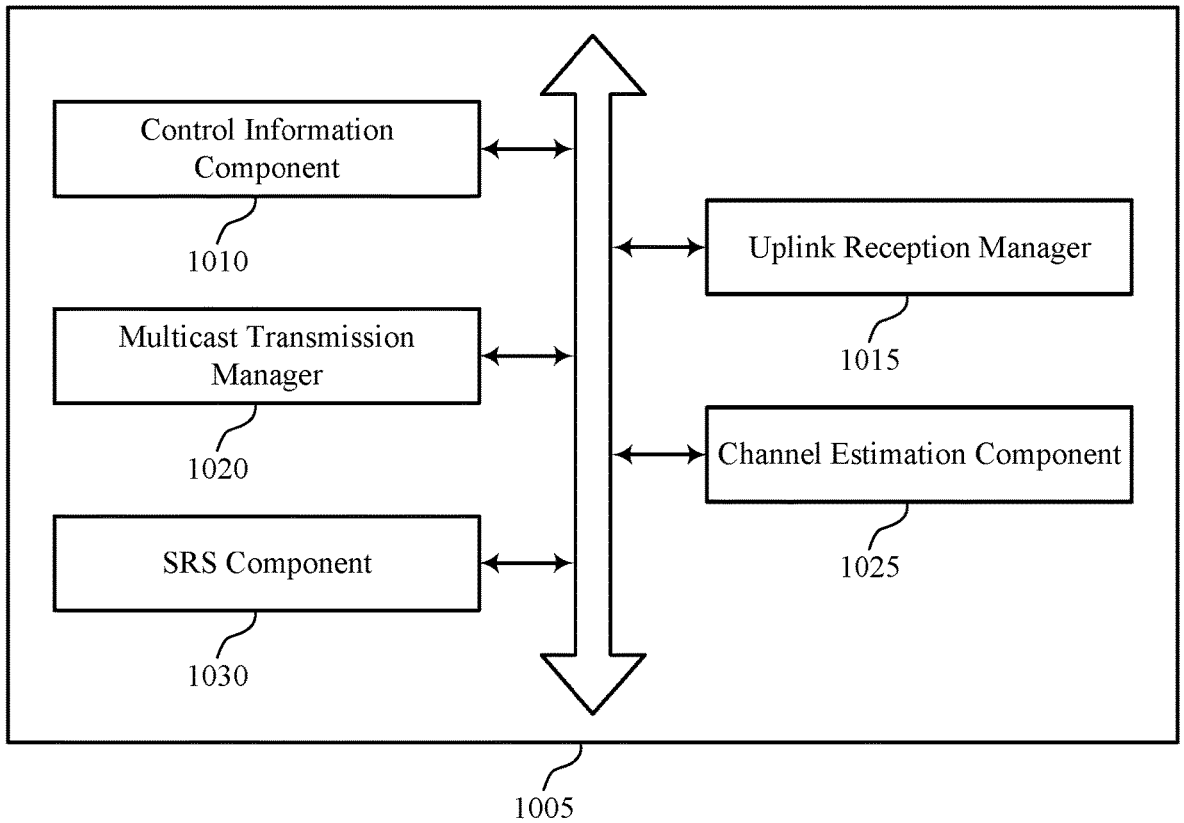
FIG. 10 shows a block diagram of a communications manager that supports reporting multicast feedback based on reference signal transmissions in accordance with aspects of the present disclosure.

FIG. 10 shows a block diagram 1000 of a communications manager 1005 that supports reporting multicast feedback based on reference signal transmissions in accordance with aspects of the present disclosure. The communications manager 1005 may be an example of aspects of a communications manager 915 or a communications manager 1110 described herein. The communications manager 1005 may include control information component 1010, uplink reception manager 1015, multicast transmission manager 1020, channel estimation component 1025, and SRS component 1030. Each of these modules may communicate, directly or indirectly, with one another (e.g., via one or more buses).

Control information component 1010 may transmit, over a multicast channel, an indication of uplink reference signal resources for transmission of sounding reference signals, where the uplink reference signal resources may be shared by a plurality of UEs associated with multicast communication.

Uplink reception manager 1015 may receive, from a UE, a sounding reference signal over one of the uplink reference signal resources, where the one of the uplink reference signal resources may be associated with a set of channel state information for the UE.

Multicast transmission manager 1020 may transmit, over the multicast channel, multicast data based on the set of channel state information for the UE.

Channel estimation component 1025 may determine a set of transmission parameters for transmitting the multicast data based on the set of channel state information.

In some cases, uplink reception manager 1015 may receive, from a second UE, a second sounding reference signal over another one of the uplink reference signal resources and concurrently with the sounding reference signal, where the other one of the uplink reference signal resources may be associated with a second set of channel state information. In some cases, control information component 1010 may determine a set of transmission parameters for transmitting the multicast data based on the set of channel state information and the second set of channel state information.

In some cases, the multicast data may be transmitted using a first set of transmission parameters. After transmitting the multicast data, uplink reception manager 1015 may receive, from a second UE, a second sounding reference signal over another one of the uplink reference signal resources that may be associated with a second set of channel state information. In some cases, channel estimation component 1025 may determine a second set of transmission parameters for transmitting second multicast data based on the second set of channel state information, and multicast transmission manager 1020 may transmit the second multicast data using the second set of transmission parameters based on the determining.

In some cases, uplink reception manager 1015 may receive, from a plurality of UEs after transmitting the multicast data, a plurality of sounding reference signals over a plurality of the uplink reference signal resources. In some cases, the plurality of the uplink reference signal resources may be associated with a plurality of sets of channel state information. In some cases, channel estimation component 1025 may determine a set of transmission parameters for transmitting second multicast data independent of the plurality of sets of channel state information based on the plurality of sets of channel state information including different CSI-RS indices.

In some cases, control information component 1010 may transmit an indication of associations between the uplink reference signal resources and sets of channel state information. In some cases, control information component 1010 may transmit an indication of a plurality of CSI-RSs for the UE to measure or a quantity of CSI-RSs for the UE to measure. In some cases, control information component 1010 may receive an indication of a quantity of CSI-RSs measured by the UE.

In some cases, the uplink reference signal resources include a first set of uplink reference signal resources associated with a first precoding resource block group and a second set of uplink reference signal resources associated with a second precoding resource block group. In such cases, uplink reception manager 1015 may receive the sounding reference signal over the first set of uplink reference signal resources associated with the first precoding resource block group, the first precoding resource block group being associated with the set of channel state information. In some cases, channel estimation component 1025 may determine a precoding matrix for transmitting the multicast data based on receiving the sounding reference signal over the first set of uplink reference signal resources associated with the first precoding resource block group.

SRS component 1030 may transmit a radio resource control message indicating that the uplink reference signal resources are configured to occur periodically. In some cases, the sounding reference signal may be received in one instance of the periodic uplink reference signal resources. In some cases, control information component 1010 may transmit a control element in a multicast data channel, and the sounding reference signal may be received based on transmitting the control element. In some cases, control information component 1010 may transmit downlink control information format that schedules a multicast data channel, and the sounding reference signal may be received based on transmitting the downlink control information format.

In some cases, uplink reception manager 1015 may determine, based on receiving the sounding reference signal, that the UE failed to decode an initial, earlier transmission of the multicast data. In some cases, the transmission of the multicast data may include a retransmission of the multicast data based on the determination.

Figure 11:
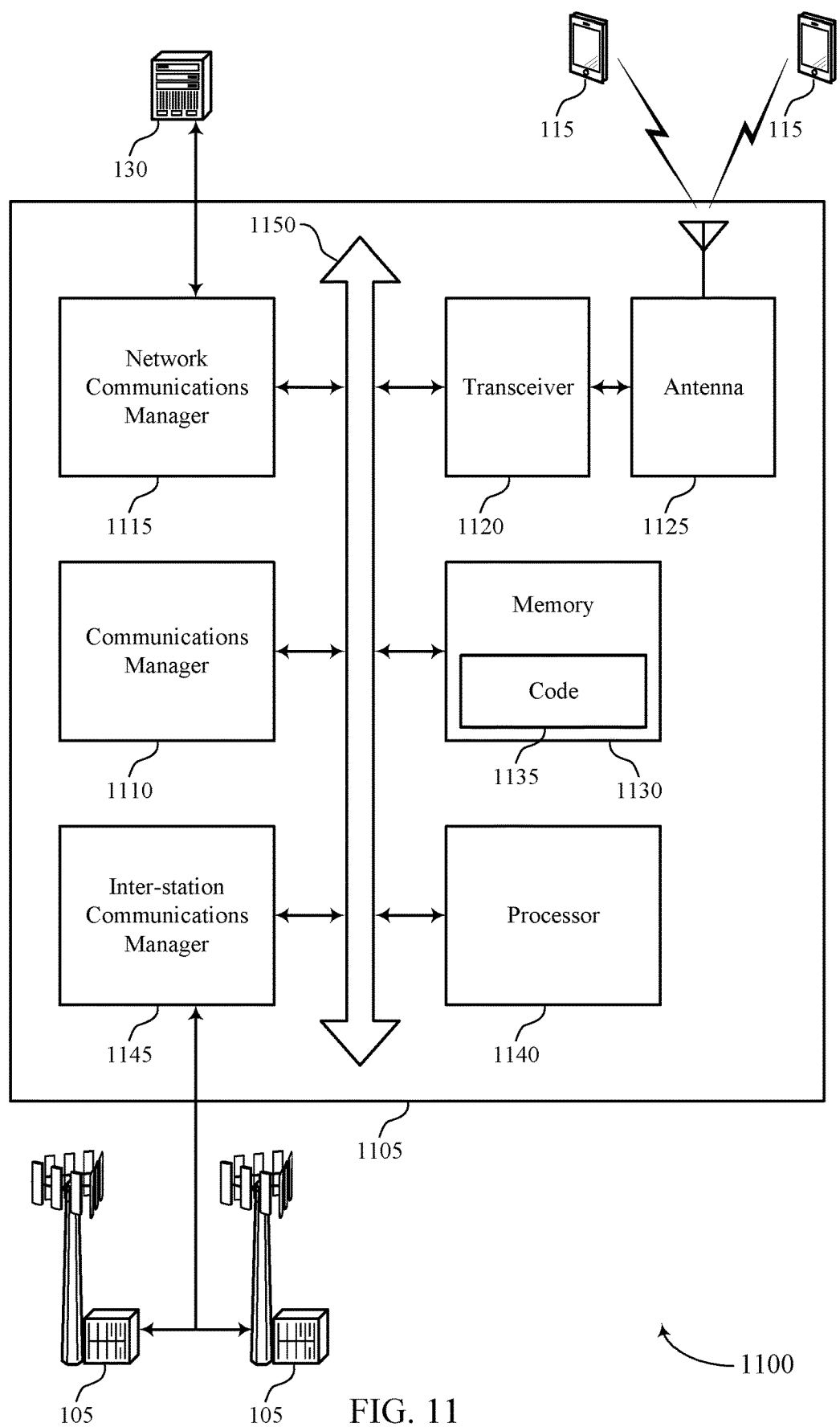
FIG. 11 shows a diagram of a system including a device that supports reporting multicast feedback based on reference signal transmissions in accordance with aspects of the present disclosure.

FIG. 11 shows a diagram of a system 1100 including a device 1105 that supports reporting multicast feedback based on reference signal transmissions in accordance with aspects of the present disclosure. The device 1105 may be an example of or include the components of device 905 or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, over a multicast channel, an indication of uplink reference signal resources for transmission of sounding reference signals, the uplink reference signal resources to be shared by a set of UEs associated with multicast communication, receive, from a UE, a sounding reference signal over one of the uplink reference signal resources, the one of the uplink reference signal resources associated with a set of channel state information for the UE, and transmit, over the multicast channel, multicast data based on the set of channel state information for the UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting multicast feedback based on reference signal transmissions).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
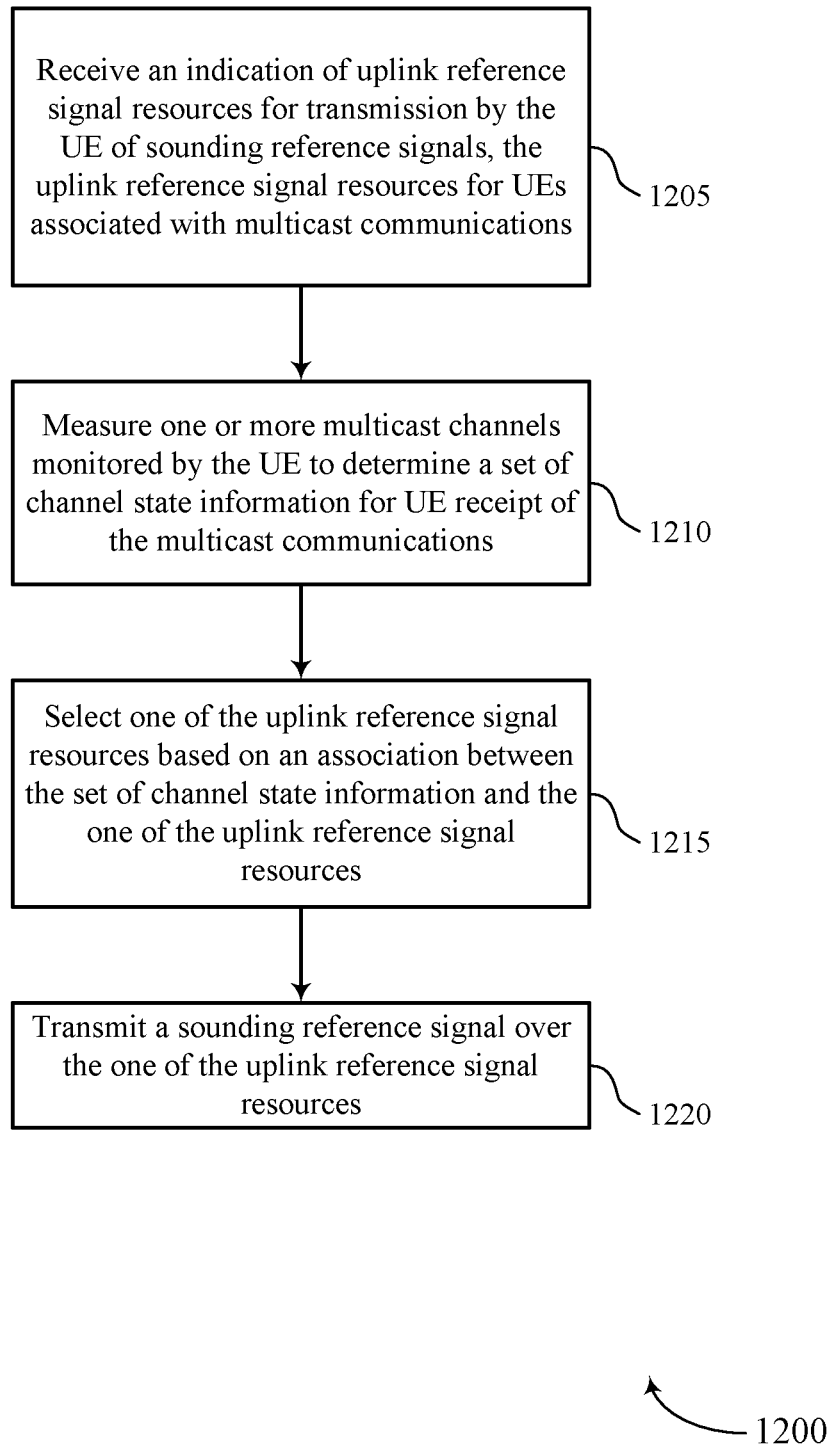
FIGS. 12 and 13 show flowcharts illustrating methods that support multicast feedback based on reference signal transmissions in accordance with aspects of the present disclosure.

FIG. 12 shows a flowchart illustrating a method 1200 that supports reporting multicast feedback based on reference signal transmissions in accordance with aspects of the present disclosure. The operations of method 1200 may be implemented by a UE 115 or its components as described herein. For example, the operations of method 1200 may be performed by a communications manager as described with reference to FIGS. 6 through 8. In some examples, a UE may execute a set of instructions to control the functional elements of the UE to perform the functions described below. Additionally, or alternatively, a UE may perform aspects of the functions described below using special-purpose hardware.

At 1205, the UE may receive an indication of uplink reference signal resources for transmission by the UE of sounding reference signals, the uplink reference signal resources to for UEs associated with multicast communications. The operations of 1205 may be performed according to the methods described herein. In some examples, aspects of the operations of 1205 may be performed by a control information component as described with reference to FIGS. 6 through 8.

At 1210, the UE may measure one or more multicast channels monitored by the UE to determine a set of channel state information for UE receipt of the multicast communications. The operations of 1210 may be performed according to the methods described herein. In some examples, aspects of the operations of 1210 may be performed by a channel estimation component as described with reference to FIGS. 6 through 8.

At 1215, the UE may select one of the uplink reference signal resources based on an association between the set of channel state information and the one of the uplink reference signal resources. The operations of 1215 may be performed according to the methods described herein. In some examples, aspects of the operations of 1215 may be performed by an uplink resource selector as described with reference to FIGS. 6 through 8.

At 1220, the UE may transmit a sounding reference signal over the one of the uplink reference signal resources. The operations of 1220 may be performed according to the methods described herein. In some examples, aspects of the operations of 1220 may be performed by an uplink transmission manager as described with reference to FIGS. 6 through 8.

Figure 13:
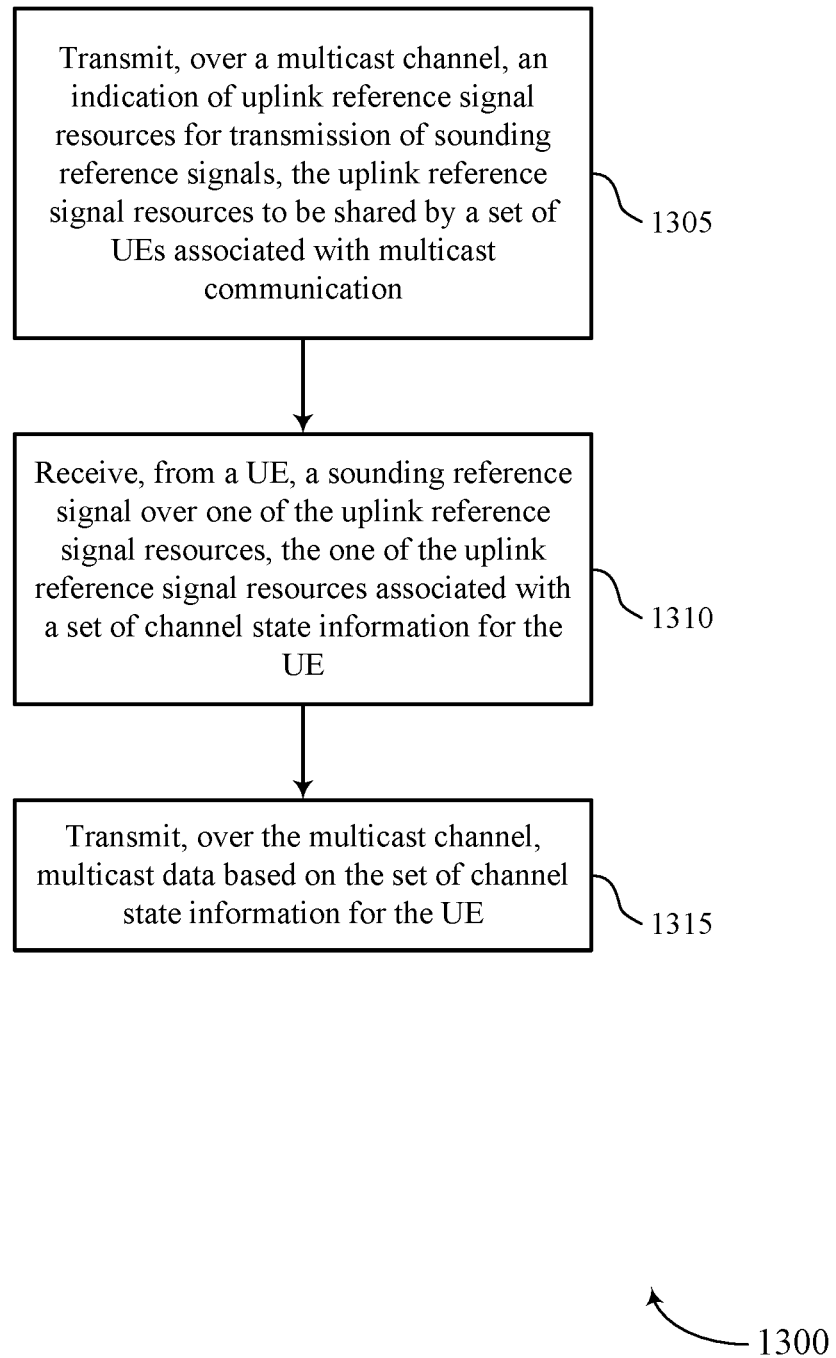

FIG. 13 shows a flowchart illustrating a method 1300 that supports reporting multicast feedback based on reference signal transmissions in accordance with aspects of the present disclosure. The operations of method 1300 may be implemented by a base station 105 or its components as described herein. For example, the operations of method 1300 may be performed by a communications manager as described with reference to FIGS. 9 through 11. In some examples, a base station may execute a set of instructions to control the functional elements of the base station to perform the functions described below. Additionally, or alternatively, a base station may perform aspects of the functions described below using special-purpose hardware.

At 1305, the base station may transmit, over a multicast channel, an indication of uplink reference signal resources for transmission of sounding reference signals, the uplink reference signal resources to be shared by a set of UEs associated with multicast communication. The operations of 1305 may be performed according to the methods described herein. In some examples, aspects of the operations of 1305 may be performed by a control information component as described with reference to FIGS. 9 through 11.

At 1310, the base station may receive, from a UE, a sounding reference signal over one of the uplink reference signal resources, the one of the uplink reference signal resources associated with a set of channel state information for the UE. The operations of 1310 may be performed according to the methods described herein. In some examples, aspects of the operations of 1310 may be performed by an uplink reception manager as described with reference to FIGS. 9 through 11.

At 1315, the base station may transmit, over the multicast channel, multicast data based on the set of channel state information for the UE. The operations of 1315 may be performed according to the methods described herein. In some examples, aspects of the operations of 1315 may be performed by a multicast transmission manager as described with reference to FIGS. 9 through 11.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1

A method for wireless communications at a UE, comprising: receiving an indication of uplink reference signal resources for transmission by the UE of sounding reference signals, the uplink reference signal resources for UEs associated with multicast communications; measuring one or more multicast channels monitored by the UE to determine a set of channel state information for UE receipt of the multicast communications; selecting one of the uplink reference signal resources based at least in part on an association between the set of channel state information and the one of the uplink reference signal resources; and transmitting a sounding reference signal over the one of the uplink reference signal resources.

Example 2

The method of example 1, wherein the selecting comprises: identifying the one of the uplink reference signal resources based at least in part on the set of channel state information determined by the UE.

Example 3

The method of any one of examples 1 through 2, further comprising: determining that the set of channel state information comprises a CSI-RS index, a precoding matrix index, and a channel quality index; and identifying the one of the uplink reference signal resources as being associated with the CSI-reference signal index, the precoding matrix index, and the channel quality index.

Example 4

The method of any one of examples 1 through 2, further comprising: identifying a set of the uplink reference signal resources that is associated with one or more CSI-RS indices, wherein the one of the uplink reference signal resources is selected from the set of the uplink reference signal resources.

Example 5

The method of any one of examples 1 through 4, further comprising: identifying a set of the uplink reference signal resources that is associated with one or more precoding matrix indices, wherein the one of the uplink reference signal resources is selected from the set of the uplink reference signal resources.

Example 6

The method of any one of examples 1 through 5, further comprising: identifying a set of the uplink reference signal resources that is associated with one or more channel quality indices, wherein the one of the uplink reference signal resources is selected from the set of the uplink reference signal resources.

Example 7

The method of any one of examples 1 through 6, further comprising: determining that the set of channel state information comprises a CSI-reference signal index; and identifying a set of the uplink reference signal resources that is associated with the CSI-reference signal index, wherein the one of the uplink reference signal resources is selected from the set of the uplink reference signal resources.

Example 8

The method of example 7, further comprising: determining that the set of channel state information comprises a precoding matrix index; and identifying, from the set of the uplink reference signal resources, a subset of the uplink reference signal resources that is associated with a first set of precoding matrix indices comprising the precoding matrix index, wherein the one of the uplink reference signal resources is selected from the subset of the uplink reference signal resources.

Example 9

The method of any one of examples 7 through 8, further comprising: determining that the set of channel state information comprises a channel quality index; and identifying, from the subset of the uplink reference signal resources, a first uplink reference signal resource that is associated with a first set of channel quality indices comprising the channel quality index, wherein the first uplink reference signal resource is selected as the one of the uplink reference signal resources.

Example 10

The method of any one of examples 7 through 9, further comprising: identifying, from the subset of the uplink reference signal resources, a second uplink reference signal resource that is associated with a second set of channel quality indices comprising the channel quality index, wherein the first uplink reference signal resource or the second uplink reference signal resource is selected as the one of the uplink reference signal resources.

Example 11

The method of any one of examples 1 through 6, wherein the one of the uplink reference signal resources is selected based at least in part on the UE being associated with a first group of UEs, the method further comprising: determining that a condition of the one or more multicast channels has changed by a threshold amount, wherein the UE is associated with a second group of UEs based at least in part on the condition changing by the threshold amount; and selecting a different uplink reference signal resource of the uplink reference signal resources based at least in part on being associated with the second group of UEs.

Example 12

The method of any one of examples 1 through 6, further comprising: receiving a first multicast transmission using a first set of transmission parameters, wherein transmitting the sounding reference signal indicates that the first multicast transmission has been unsuccessfully decoded; and receiving, based at least in part on transmitting the sounding reference signal, a second multicast transmission that is transmitted based at least in part on the association between the set of channel state information and the one of the uplink reference signal resources.

Example 13

The method of example 12, wherein the receiving comprises: receiving the second multicast transmission over a transmission beam indicated by the association between the set of channel state information and the one of the uplink reference signal resources.

Example 14

The method of example 12, wherein the receiving comprises: receiving the second multicast transmission using a modulation and coding scheme indicated by the association between the set of channel state information and the one of the uplink reference signal resources.

Example 15

The method of example 12, wherein the second multicast transmission comprises a retransmission of data included in the first multicast transmission.

Example 16

The method of any one of examples 1 through 15, further comprising: determining associations between each of the uplink reference signal resources and sets of channel state information, wherein the one of the uplink reference signal resources is selected based at least in part on the associations.

Example 17

The method of example 16, wherein determining the associations comprises determining that: a first set of the uplink reference signal resources is associated with a first CSI-reference signal index, a second set of the uplink reference signal resources is associated with a second CSI-reference signal index, a first subset of the first set of the uplink reference signal resources is associated with a first set of precoding matrix indices, a second subset of the first set of the uplink reference signal resources is associated with a second set of precoding matrix indices, a first uplink reference signal resource of the first subset of the first set of the uplink reference signal resources is associated with a first set of channel quality indices, and a second uplink reference signal resource of the first subset of the first set of the uplink reference signal resources is associated with a second set of channel quality indices.

Example 18

The method of example 17, wherein the first set of the uplink reference signal resources corresponds to a first group of UEs based at least in part on the first CSI-reference signal index indicating a first transmission beam, and the second set of the uplink reference signal resources corresponds to a second group of UEs based at least in part on the second CSI-reference signal index indicating a second transmission beam.

Example 19

The method of any one of examples 16 through 18, further comprising: receiving an indication of the associations in a radio resource control message or a physical downlink control channel message.

Example 20

The method of any one of examples 1 through 19, further comprising: measuring one or more CSI-reference signals transmitted over the one or more multicast channels; and determining the set of channel state information based at least in part on the one or more CSI-reference signals.

Example 21

The method of example 20, further comprising: receiving, from a base station, an indication of the one or more CSI-reference signals to measure.

Example 22

The method of example 20, further comprising: determining, by the UE, a quantity of CSI-reference signals to measure; selecting the one or more CSI-reference signals based at least in part on the determining, the one or more CSI-reference signals comprising the quantity of CSI-reference signals.

Example 23

The method of example 22, further comprising: receiving, from a base station, an indication of the quantity of CSI-reference signals for the UE to measure; or transmitting, to the base station, the indication of the quantity of CSI-reference signals measured by the UE.

Example 24

The method of any one of examples 1 through 20, further comprising: measuring a plurality of demodulation reference signals transmitted over the one or more multicast channels, the plurality of demodulation reference signals being associated with a plurality of precoding resource block groups; and determining the set of channel state information based at least in part on the plurality of demodulation reference signals.

Example 25

The method of example 24, further comprising: determining that a demodulation reference signal of the plurality of demodulation reference signals has a highest signal-to-noise ratio based at least in part on the measuring, the demodulation reference signal being associated with a precoding resource block group; and identifying a set of the uplink reference signal resources that is associated with the precoding resource block group based at least in part on the determining, wherein the one of the uplink reference signal resources is selected from the set of the uplink reference signal resources.

Example 26

The method of example 1, further comprising: determining, for the set of channel state information, a precoding matrix indicator, channel quality indicator, or channel state information-reference signal resource indicator, or any combination thereof, based at least in part on measuring the one or more multicast channels.

Example 27

The method of any one of examples 1 through 26, further comprising: receiving a radio resource control message comprising the indication of the uplink reference signal resources; and determining, based at least in part on the radio resource control message, that the uplink reference signal resources occur periodically, wherein the sounding reference signal is transmitted in one instance of the periodic reference signal resources.

Example 28

The method of example 27, further comprising: receiving a control element in a multicast data channel, wherein transmitting the sounding reference signal is based at least in part on receiving the control element.

Example 29

The method of example 27, further comprising: receiving a downlink control information format that schedules a multicast data channel, wherein transmitting the sounding reference signal is based at least in part on receiving the downlink control information format.

Example 30

The method of any one of examples 1 through 29, further comprising: receiving a multicast data channel over the one or more multicast channels; and transmitting the sounding reference signal based at least in part on failing to decode multicast data conveyed in the multicast data channel.

Example 31

The method of example 30, further comprising: determining that transmitting the sounding reference signal over the one of the uplink reference signal resources conflicts with transmitting an uplink control channel or uplink data channel; and prioritizing the sounding reference signal over the uplink control channel or uplink data channel by transmitting the sounding reference signal and dropping the transmission of the uplink control channel or uplink data channel.

Example 32

The method of example 30, further comprising: receiving a re-transmission of the multicast data based at least in part on transmitting the sounding reference signal.

Example 33

A method for wireless communications at a base station, comprising: transmitting, over a multicast channel, an indication of uplink reference signal resources for transmission of sounding reference signals, the uplink reference signal resources to be shared by a plurality of user equipments (UEs) associated with multicast communication; receiving, from a UE, a sounding reference signal over one of the uplink reference signal resources, the one of the uplink reference signal resources associated with a set of channel state information for the UE; and transmitting, over the multicast channel, multicast data based at least in part on the set of channel state information for the UE.

Example 34

The method of example 33, further comprising: determining a set of transmission parameters for transmitting the multicast data based at least in part on the set of channel state information.

Example 35

The method of any one of examples 33 through 34, further comprising: receiving, from a second UE, a second sounding reference signal over another one of the uplink reference signal resources and concurrently with the sounding reference signal, the other one of the uplink reference signal resources being associated with a second set of channel state information; and determining a set of transmission parameters for transmitting the multicast data based at least in part on the set of channel state information and the second set of channel state information.

Example 36

The method of any one of examples 33 through 35, wherein the multicast data is transmitted using a first set of transmission parameters, the method further comprising: receiving, from a second UE after transmitting the multicast data, a second sounding reference signal over another one of the uplink reference signal resources, the other one of the uplink reference signal resources being associated with a second set of channel state information; determining a second set of transmission parameters for transmitting second multicast data based at least in part on the second set of channel state information; and transmitting the second multicast data using the second set of transmission parameters based at least in part on the determining.

Example 37

The method of any one of examples 33 through 36, further comprising: receiving, from a plurality of UEs after transmitting the multicast data, a plurality of sounding reference signals over a plurality of the uplink reference signal resources, the plurality of the uplink reference signal resources being associated with a plurality of sets of channel state information; and determining a set of transmission parameters for transmitting second multicast data independent of the plurality of sets of channel state information based at least in part on the plurality of sets of channel state information comprising different CSI-reference signal indices.

Example 38

The method of any one of examples 33 through 37, further comprising: transmitting an indication of associations between the uplink reference signal resources and sets of channel state information.

Example 39

The method of any one of examples 33 through 38, further comprising: transmitting an indication of a plurality of CSI-reference signals for the UE to measure or a quantity of CSI-reference signals for the UE to measure.

Example 40

The method of any one of examples 33 through 39, further comprising: receiving an indication of a quantity of CSI-reference signals measured by the UE.

Example 41

The method of any one of examples 33 through 40, wherein the uplink reference signal resources comprises a first set of uplink reference signal resources associated with a first precoding resource block group and a second set of uplink reference signal resources associated with a second precoding resource block group, receiving the sounding reference signal comprises receiving the sounding reference signal over the first set of uplink reference signal resources associated with the first precoding resource block group, the first precoding resource block group being associated with the set of channel state information.

Example 42

The method of example 41, further comprising: determining a precoding matrix for transmitting the multicast data based at least in part on receiving the sounding reference signal over the first set of uplink reference signal resources associated with the first precoding resource block group.

Example 43

The method of any one of examples 33 through 42, further comprising: transmitting a radio resource control message indicating that the uplink reference signal resources are configured to occur periodically, wherein the sounding reference signal is received in one instance of the periodic uplink reference signal resources.

Example 44

The method of example 43, further comprising: transmitting a control element in a multicast data channel, wherein the sounding reference signal is received based at least in part on transmitting the control element.

Example 45

The method of example 43, further comprising: transmitting a downlink control information format that schedules a multicast data channel, wherein the sounding reference signal is received based at least in part on transmitting the downlink control information format.

Example 46

The method of any one of examples 33 through 45, further comprising: determining, based at least in part on receiving the sounding reference signal, that the UE failed to decode an initial transmission of the multicast data, wherein the transmission of the multicast data comprises a retransmission of the multicast data and is based at least in part on the determination.

Example 47

An apparatus for wireless communications at a UE comprising at least one means for performing a method of any one of examples 1 through 32.

Example 48

An apparatus for wireless communications at a UE comprising a processor and memory coupled with the processor, the processor and memory configured to perform a method of any one of examples 1 through 32.

Example 50

A non-transitory computer-readable medium storing code for wireless communications at a UE, the code comprising instructions executable by a processor to perform a method of any one of examples 1 through 32.

Example 51

An apparatus for wireless communications at a base station comprising at least one means for performing a method of any one of examples 33 through 46.

Example 52

An apparatus for wireless communications at a base station comprising a processor and memory coupled with the processor, the processor and memory configured to perform a method of any one of examples 33 through 46.

Example 54

A non-transitory computer-readable medium storing code for wireless communications at a base station for wireless communications at a base station the code comprising instructions executable by a processor to perform a method of any one of examples 33 through 46.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving an indication of one or more uplink reference signal resources for transmission by the UE of sounding reference signals, wherein the one or more uplink reference signal resources are for one or more UEs associated with multicast communications, and wherein each uplink reference signal resource of the one or more uplink reference signal resources is mapped to a respective set of channel state information;
    measuring one or more multicast channels monitored by the UE to determine a set of channel state information for UE receipt of the multicast communications;
    selecting, from the one or more uplink reference signal resources, an uplink reference signal resource to indicate the set of channel state information based at least in part on the set of channel state information being mapped to the uplink reference signal resource; and
    transmitting a sounding reference signal over the uplink reference signal resource.

2. The method of claim 1, further comprising:
    determining that the set of channel state information comprises a channel state information (CSI)-reference signal index, a precoding matrix index, and a channel quality index; and
    identifying the uplink reference signal resource as being associated with the CSI-reference signal index, the precoding matrix index, and the channel quality index.

3. The method of claim 1, further comprising:
    identifying a set of the one or more uplink reference signal resources that is associated with one or more channel state information (CSI)-reference signal indices, wherein the uplink reference signal resource is selected from the set of the one or more uplink reference signal resources.

4. The method of claim 1, further comprising:
    identifying a set of the one or more uplink reference signal resources that is associated with one or more precoding matrix indices, wherein the uplink reference signal resource is selected from the set of the one or more uplink reference signal resources.

5. The method of claim 1, further comprising:
    identifying a set of the one or more uplink reference signal resources that is associated with one or more channel quality indices, wherein the uplink reference signal resource is selected from the set of the one or more uplink reference signal resources.

6. The method of claim 1, further comprising:
    determining that the set of channel state information comprises a channel state information (CSI)-reference signal index; and
    identifying a set of the one or more uplink reference signal resources that is associated with the CSI-reference signal index, wherein the uplink reference signal resource is selected from the set of the one or more uplink reference signal resources.

7. The method of claim 6, further comprising:
determining that the set of channel state information comprises a precoding matrix index; and
identifying, from the set of the one or more uplink reference signal resources, a subset uplink reference signal resources that is associated with a first set of precoding matrix indices comprising the precoding matrix index, wherein the uplink reference signal resource is selected from the subset uplink reference signal resources.

8. The method of claim 7, further comprising:
determining that the set of channel state information comprises a channel quality index; and
identifying, from the subset uplink reference signal resources, a first uplink reference signal resource that is associated with a first set of channel quality indices comprising the channel quality index, wherein the first uplink reference signal resource is selected as the uplink reference signal resource.

9. The method of claim 8, further comprising:
identifying, from the subset uplink reference signal resources, a second uplink reference signal resource that is associated with a second set of channel quality indices comprising the channel quality index, wherein the first uplink reference signal resource or the second uplink reference signal resource is selected as the uplink reference signal resource.

10. The method of claim 1, further comprising:
receiving a first multicast transmission using a first set of transmission parameters, wherein transmitting the sounding reference signal indicates that the first multicast transmission has been unsuccessfully decoded; and
receiving, based at least in part on transmitting the sounding reference signal, a second multicast transmission that is transmitted based at least in part on the mapping between the set of channel state information and the uplink reference signal resource.

11. The method of claim 10, wherein the receiving comprises:
receiving the second multicast transmission over a transmission beam indicated by the mapping between the set of channel state information and the uplink reference signal resource.

12. The method of claim 10, wherein the receiving comprises:
receiving the second multicast transmission using a modulation and coding scheme indicated by the mapping between the set of channel state information and the uplink reference signal resource.

13. The method of claim 10, wherein the second multicast transmission comprises a retransmission of data included in the first multicast transmission.

14. The method of claim 1, further comprising:
determining the mapping between each of the one or more uplink reference signal resources and sets of channel state information, wherein the uplink reference signal resource is selected based at least in part on the mappings.

15. The method of claim 14, further comprising:
receiving an indication of the mappings in a radio resource control message or a physical downlink control channel message.

16. The method of claim 1, further comprising:
measuring one or more channel state information (CSI)-reference signals transmitted over the one or more multicast channels; and
determining the set of channel state information based at least in part on the one or more CSI-reference signals.

17. The method of claim 16, further comprising:
receiving, from a network device, an indication of the one or more CSI-reference signals to measure.

18. The method of claim 16, further comprising:
determining, by the UE, a quantity of CSI-reference signals to measure;
selecting the one or more CSI-reference signals based at least in part on the determining, the one or more CSI-reference signals comprising the quantity of CSI-reference signals.

19. The method of claim 1, further comprising:
measuring a plurality of demodulation reference signals transmitted over the one or more multicast channels, the plurality of demodulation reference signals being associated with a plurality of precoding resource block groups; and
determining the set of channel state information based at least in part on the plurality of demodulation reference signals.

20. The method of claim 19, further comprising:
determining that a demodulation reference signal of the plurality of demodulation reference signals has a highest signal-to-noise ratio based at least in part on the measuring, the demodulation reference signal being associated with a precoding resource block group; and
identifying a set of the one or more uplink reference signal resources that is associated with the precoding resource block group based at least in part on the determining, wherein the uplink reference signal resource is selected from the set of the one or more uplink reference signal resources.

21. The method of claim 1, further comprising:
determining, for the set of channel state information, a precoding matrix indicator, channel quality indicator, or channel state information-reference signal resource indicator, or any combination thereof, based at least in part on measuring the one or more multicast channels.

22. The method of claim 1, further comprising:
receiving a radio resource control message comprising the indication of the one or more uplink reference signal resources; and
determining, based at least in part on the radio resource control message, that the one or more uplink reference signal resources occur periodically, wherein the sounding reference signal is transmitted in one instance of the periodically occurring one or more uplink reference signal resources.

23. The method of claim 22, further comprising:
receiving a control element in a multicast data channel, wherein transmitting the sounding reference signal is based at least in part on receiving the control element.

24. The method of claim 22, further comprising:
receiving a downlink control information format that schedules a multicast data channel, wherein transmitting the sounding reference signal is based at least in part on receiving the downlink control information format.

25. The method of claim 1, further comprising:
receiving a multicast data channel over the one or more multicast channels; and
transmitting the sounding reference signal based at least in part on failing to decode multicast data conveyed in the multicast data channel.

26. The method of claim 25, further comprising:
determining that transmitting the sounding reference signal over the uplink reference signal resource conflicts with transmitting an uplink control channel or uplink data channel; and
prioritizing the sounding reference signal over the uplink control channel or uplink data channel by transmitting the sounding reference signal and dropping the transmission of the uplink control channel or uplink data channel.

27. The method of claim 25, further comprising:
receiving a re-transmission of the multicast data based at least in part on transmitting the sounding reference signal.

28. An apparatus for wireless communications at a user equipment (UE), comprising:
a processor,
memory coupled with the processor; and
instructions stored in the memory and executable by the processor to cause the apparatus to:
receive an indication of one or more uplink reference signal resources for transmission by the UE of sounding reference signals, wherein the one or more uplink reference signal resources are for one or more UEs associated with multicast communications, and wherein each uplink reference signal resource of the one or more uplink reference signal resources is mapped to a respective set of channel state information;
measure one or more multicast channels monitored by the UE to determine a set of channel state information for UE receipt of the multicast communications;
select, from the one or more uplink reference signal resources, an uplink reference signal resource to indicate the set of channel state information based at least in part on the set of channel state information being mapped to the uplink reference signal resource; and
transmit a sounding reference signal over the uplink reference signal resource.

29. An apparatus for wireless communications at a user equipment (UE), comprising:
means for receiving an indication of one or more uplink reference signal resources for transmission by the UE of sounding reference signals, wherein the one or more uplink reference signal resources are for one or more UEs associated with multicast communications, and wherein each uplink reference signal resource of the one or more uplink reference signal resources is mapped to a respective set of channel state information;
means for measuring one or more multicast channels monitored by the UE to determine a set of channel state information for UE receipt of the multicast communications;
means for selecting, from the one or more uplink reference signal resources, an uplink reference signal resource to indicate the set of channel state information based at least in part on the set of channel state information being mapped to the uplink reference signal resource; and
means for transmitting a sounding reference signal over the uplink reference signal resource.

30. A non-transitory computer-readable medium storing code for wireless communications at a user equipment (UE), the code comprising instructions executable by a processor to:
receive an indication of one or more uplink reference signal resources for transmission by the UE of sounding reference signals, wherein the one or more uplink reference signal resources are for one or more UEs associated with multicast communications, and wherein each uplink reference signal resource of the one or more uplink reference signal resources is mapped to a respective set of channel state information;
measure one or more multicast channels monitored by the UE to determine a set of channel state information for UE receipt of the multicast communications;
select, from the one or more uplink reference signal resources, an uplink reference signal resource to indicate the set of channel state information based at least in part on the set of channel state information being mapped to the uplink reference signal resource; and
transmit a sounding reference signal over the uplink reference signal resource.

* * * * *